(12) United States Patent
Iwamoto et al.

(10) Patent No.: US 8,330,843 B2
(45) Date of Patent: Dec. 11, 2012

(54) SOLID-STATE IMAGE SENSING DEVICE, METHOD FOR DRIVING SOLID-STATE IMAGE SENSING DEVICE, AND IMAGE SENSING SYSTEM INCORPORATED WITH SOLID-STATE IMAGE SENSING DEVICE

(75) Inventors: Tsuyoshi Iwamoto, Nishinomiya (JP); Koichi Kamon, Otokuni-gun (JP); Masayuki Kusuda, Akashi (JP); Shigehiro Miyatake, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 852 days.

(21) Appl. No.: 12/100,813

(22) Filed: Apr. 10, 2008

(65) Prior Publication Data

US 2008/0252762 A1    Oct. 16, 2008

(30) Foreign Application Priority Data

Apr. 13, 2007   (JP) ................. 2007-106387

(51) Int. Cl.
*H04N 5/235* (2006.01)
*N04N 5/335* (2006.01)

(52) U.S. Cl. ..................... 348/301; 348/229.1

(58) Field of Classification Search .......... 348/301, 348/308, 362, 222.1, 229.1, 294
See application file for complete search history.

(56) References Cited

U.S. PATENT DOCUMENTS

| | | | |
|---|---|---|---|
| 7,495,695 B2 * | 2/2009 | Nakajima et al. | 348/222.1 |
| 7,502,060 B2 * | 3/2009 | Watanabe | 348/300 |
| 7,777,798 B2 * | 8/2010 | Mabuchi | 348/308 |
| 2005/0052554 A1 * | 3/2005 | Sakurai et al. | 348/301 |
| 2005/0052557 A1 * | 3/2005 | Kusaka et al. | 348/308 |
| 2006/0001061 A1 | 1/2006 | Miyatake et al. | 257/292 |
| 2006/0097902 A1 * | 5/2006 | Muramatsu et al. | 341/155 |

FOREIGN PATENT DOCUMENTS jp   2006-50544 A1   2/2006

* cited by examiner

*Primary Examiner* — Trung Diep
(74) *Attorney, Agent, or Firm* — Cozen O'Connor

(57) ABSTRACT

In a solid-state image sensing device, a method for driving the solid-state image sensing device, and an image sensing system incorporated with the solid-state image sensing device of the invention, pixel signals having two or more different photoelectric conversion characteristics to be outputted from a pixel section are amplified by using an analog gain with respect to each of the photoelectric conversion characteristics for outputting the amplified pixel signals. This enables to reproduce an image having a wide dynamic range while suppressing lowering of the frame rate.

21 Claims, 16 Drawing Sheets

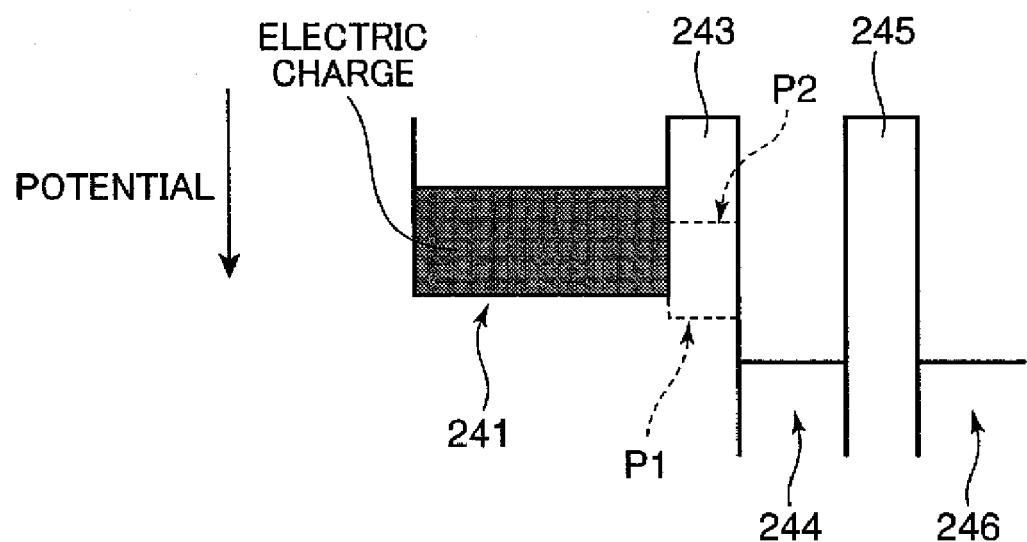
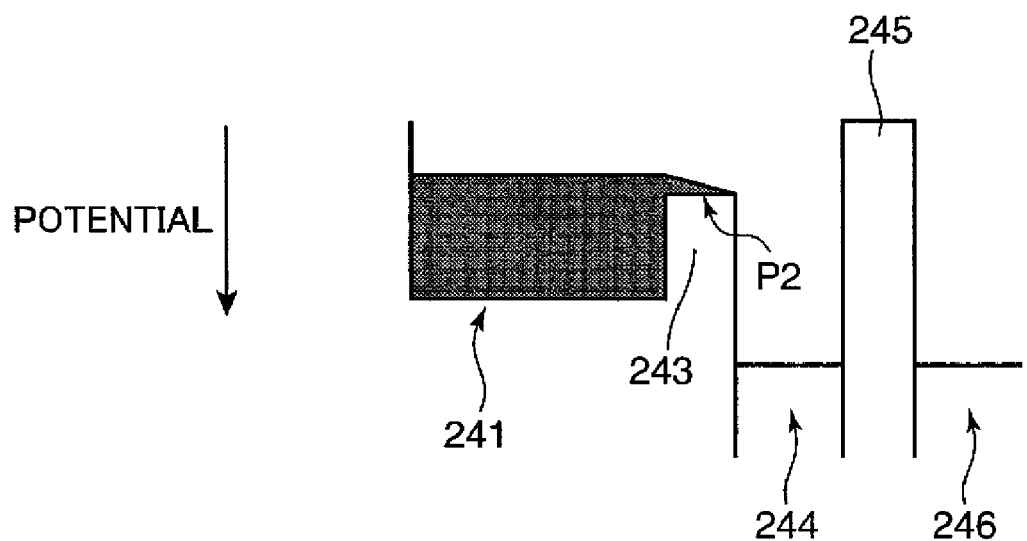

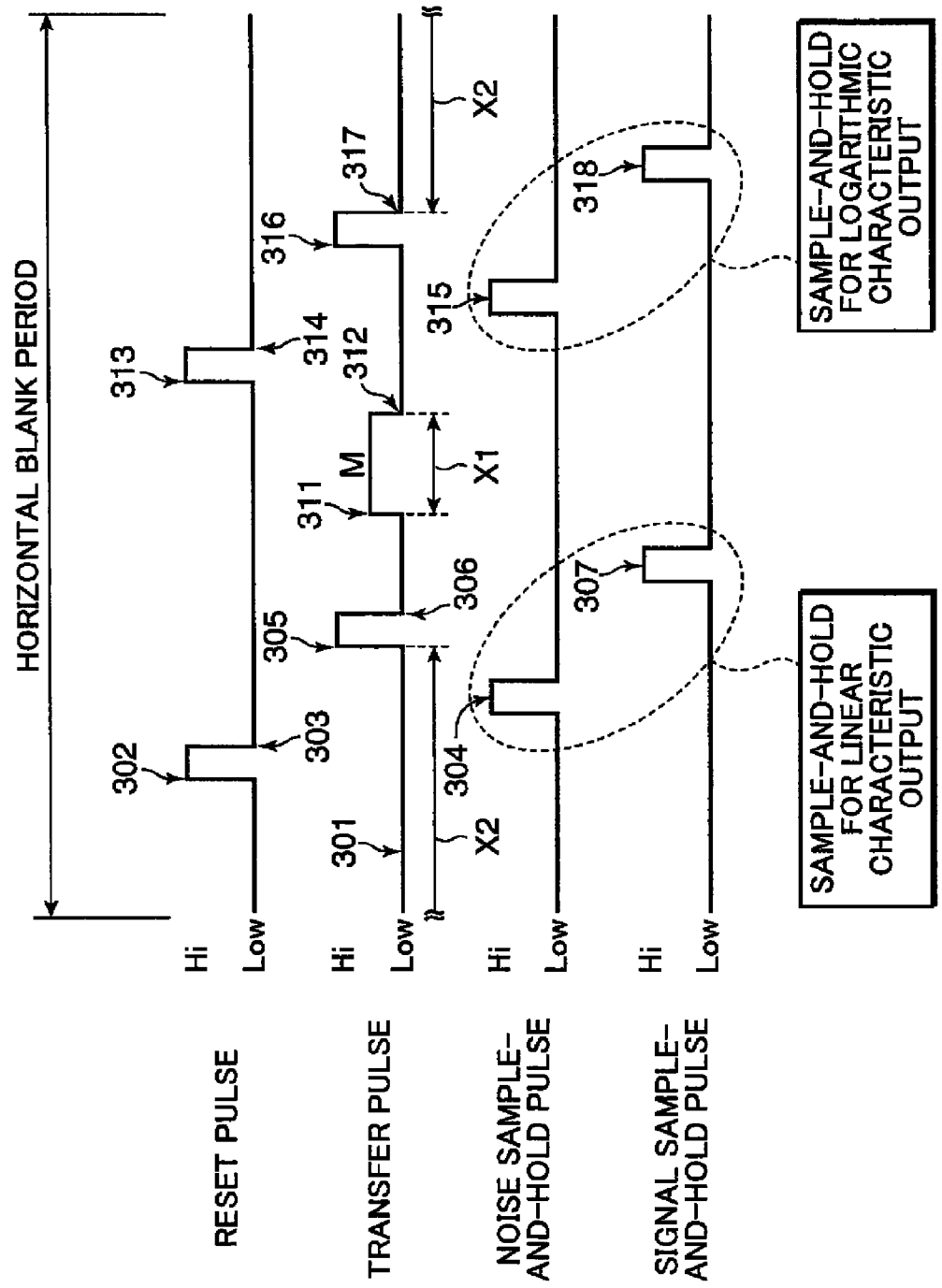

PRIOR ART

SOLID-STATE IMAGE SENSING DEVICE, METHOD FOR DRIVING SOLID-STATE IMAGE SENSING DEVICE, AND IMAGE SENSING SYSTEM INCORPORATED WITH SOLID-STATE IMAGE SENSING DEVICE

This application is based on Japanese Patent Application No. 2007-106387 filed on Apr. 13, 2007, the contents of which are hereby incorporated by reference.

BACKGROUND OF THE INVENTION

1. Field of the Invention

The present invention relates to a solid-state image sensing device, and more particularly to a solid-state image sensing device having a photoelectric conversion characteristic comprised of two or more different characteristic regions, a method for driving the solid-state image sensing device, and an image sensing system incorporated with the solid-state image sensing device.

2. Description of the Related Art

In recent years, in an image sensing apparatus such as a digital camera, as high-quality performance is demanded, a technology of expanding a luminance range i.e. a dynamic range of a subject image to be captured by a solid-state image sensing device i.e. an image sensor is required. In expanding the dynamic range, there is known a solid-state image sensing device (called as a "linear-logarithmic sensor") having a photoelectric conversion characteristic comprised of a linear characteristic 901 and a logarithmic characteristic 902 (also, called as "linear/logarithmic characteristics") as shown in e.g. FIG. 18 (see e.g. Japanese Unexamined Patent Publication No. 2006-50544 (D1)). The linear-logarithmic sensor is capable of performing linear output and logarithmic output. Hereinafter, an image having linear and logarithmic characteristics captured by the linear-logarithmic sensor may be called as a "linear-logarithmic image". The point indicated by the reference numeral 903 in FIG. 18 is a switching point i.e. the inflection point 903 between the linear characteristic and the logarithmic characteristic. With use of the linear-logarithmic sensor, the position of the inflection point 903 can be flexibly changed. By changing the inflection point 903, a ratio of the linear characteristic 901 and the logarithmic characteristic 902 is changed to thereby realize a photoelectric conversion characteristic having a larger ratio in linear characteristic region, or a photoelectric conversion characteristic having a larger ratio in logarithmic characteristic region.

In the aforementioned solid-state image sensing device, for instance, increase of a gain by a column amplifier in a column circuit of the solid-state image sensing device in order to secure gradation i.e. contrast in a dark portion of a subject image may cause an increase in gain with respect to both of the linear characteristic 901 and the logarithmic characteristic 902. In the example shown in FIG. 18, the photoelectric conversion characteristic is comprised of the linear characteristic 901 and the logarithmic characteristic 902 may turn into a photoelectric conversion characteristic comprised of a linear characteristic 901' and a logarithmic characteristic 902'. Since the output saturation level of a solid-state image sensing device is restricted, a considerable part of the linear characteristic 902' may exceed the output saturation level. As a result, the dynamic range may be narrowed from a range indicated by the arrows 904 before the gain increase to a range indicated by the arrows 905 after the gain increase.

In the case where the solid-state image sensing device disclosed in D1 is used, it is possible to switch over the output from each of pixels between the linear output and the logarithmic output with respect to each of frame images by a method for driving each of the pixels. However, in this arrangement, it is necessary to use characteristic images of two frames i.e. one frame corresponding to a linear characteristic image and one frame corresponding to a logarithmic characteristic image to reproduce one frame image having both of the linear characteristic and the logarithmic characteristic as a final image. As a result, the frame rate for reproducing an image may be lowered to half of the frame rate at which an image is reproduced by outputting either one of the two characteristic images. In other words, although the above arrangement is capable of producing an image having a wide dynamic range, the frame rate may be lowered.

SUMMARY OF THE INVENTION

In view of the above problems residing in the conventional art, it is an object of the present invention to provide a solid-state image sensing device that enables to reproduce an image having a wide dynamic range, while suppressing lowering of the frame rate, a method for driving the solid-state image sensing device, and an image sensing system incorporated with the solid-state image sensing device.

In a solid-state image sensing device, a method for driving the solid-state image sensing device, and an image sensing system incorporated with the solid-state image sensing device according to an aspect of the invention, pixel signals having two or more different photoelectric conversion characteristics to be outputted from a pixel section are amplified by using an analog gain with respect to each of the photoelectric conversion characteristics for outputting the amplified pixel signals. This enables to reproduce an image having a wide dynamic range while suppressing lowering of the frame rate.

These and other objects, features and advantages of the present invention will become more apparent upon reading the following detailed description along with the accompanying drawings.

BRIEF DESCRIPTION OF THE DRAWINGS

FIGS. 4A and 4B are potential charts schematically showing a potential in a pixel cross section, wherein FIG. 4A shows a case that a linear characteristic output is obtained in a state that the potential of a transfer gate is increased with the transfer gate being closed, and FIG. 4B shows a case that a logarithmic characteristic output is obtained in a state that the transfer gate potential is set to a mid potential.

FIGS. 5A and 5B are graphs each showing a photoelectric conversion characteristic of a signal outputted from a pixel of the image sensor, wherein FIG. 5A shows a linear characteristic as a photoelectric conversion characteristic, and FIG. 5B shows a logarithmic characteristic as a photoelectric conversion characteristic.

FIG. 6 is a timing chart showing an example on drive pulses when an image sensing operation is performed by a pixel.

DESCRIPTION OF THE PREFERRED
EMBODIMENTS OF THE INVENTION

Figure 1:
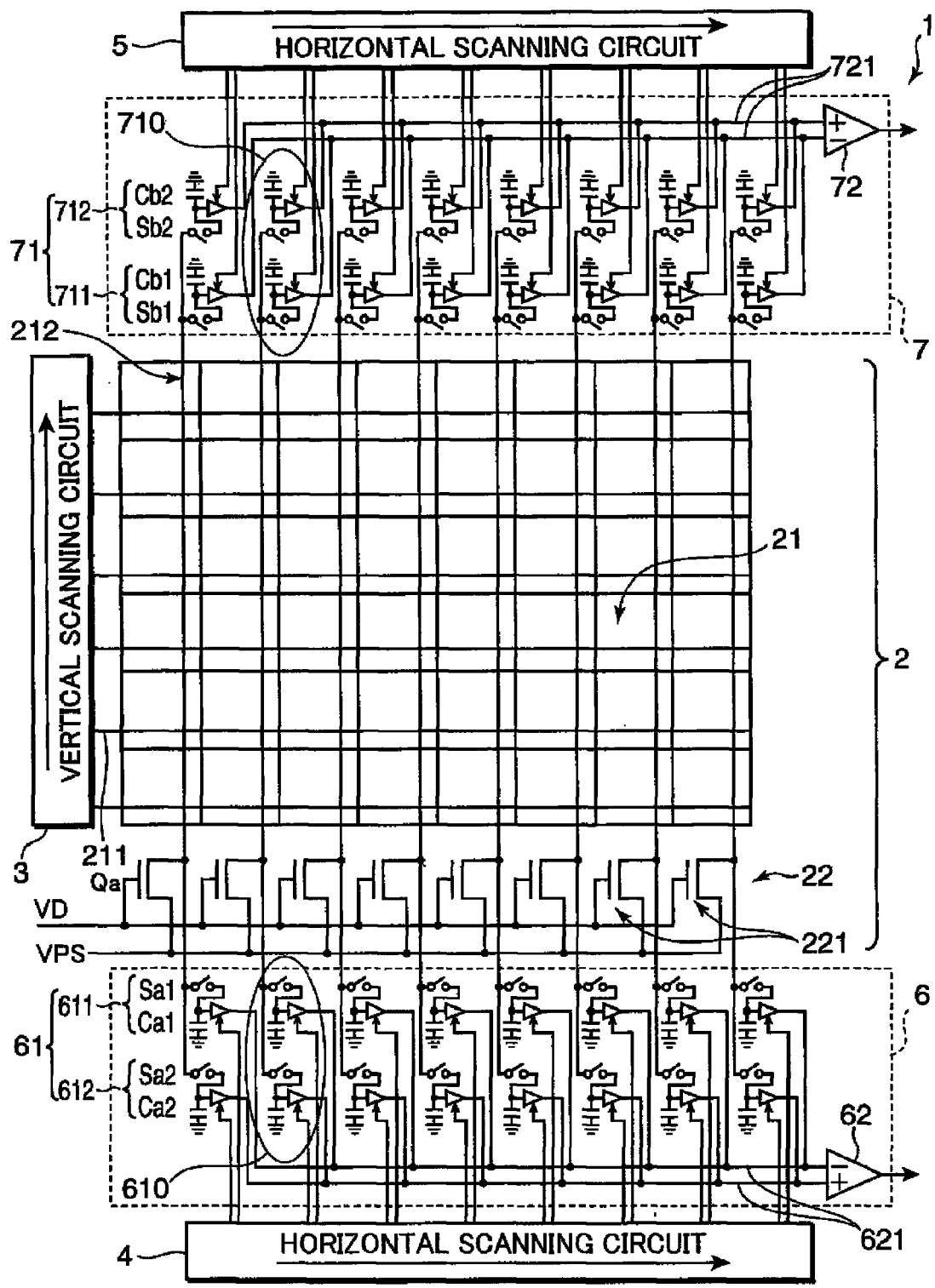
FIG. 1 is a diagram schematically showing an arrangement of an image sensor as an example of a solid-state image sensing device embodying the invention.

FIG. 1 is a diagram schematically showing an arrangement of an image sensor as an example of a solid-state image sensing device embodying the invention. The image sensor 1 is adapted to obtain a photographic image by detecting light from a subject. The image sensor 1 has two or more different photoelectric conversion characteristics. In this embodiment, the image sensor 1 has a photoelectric conversion characteristic comprised of a linear characteristic that light is linearly converted into an electric signal i.e. a pixel signal in accordance with the light amount by photoelectric conversion, when an illuminance on a photosensitive surface of the image sensor 1 i.e. an incident luminance of the image sensor 1 is low i.e. a dark image is captured, and a logarithmic characteristic that light is logarithmically converted i.e. logarithmically compressed into an electric signal in accordance with the light amount by photoelectric conversion, when the incident luminance of the image sensor 1 is high i.e. a bright image is captured. The image sensor 1 includes photoelectric conversion elements such as photodiodes, and P-type (or N-type) MOSFETs (Metal Oxide Semiconductor Field Effect Transistors). The image sensor 1 is e.g. an MOS solid-state image sensor, wherein a multitudes of pixels are arranged in a matrix pattern, and is an X-Y address type image sensor. Alternatively, the image sensor 1 may be a VMIS image sensor or a like sensor.

The image sensor 1 is capable of flexibly switching over between a photoelectric conversion characteristic merely comprised of a linear characteristic and a photoelectric conversion characteristic merely comprised of a logarithmic characteristic, in addition to the photoelectric conversion characteristic comprised of linear and logarithmic characteristics. Also, the inflection point of the photoelectric conversion characteristic is flexibly controllable based on a control signal to be outputted to the respective pixel circuits of the image sensor 1. The image sensor 1 has e.g. a Bayer pattern color filter configured in such a manner that G filters are arranged in a checkered pattern, and R and B filters are sequentially and linearly arranged. The image sensor 1 photoelectrically converts the subject light into image signals of the respective color components of R, G, and B in accordance with the light amount of the subject light to output the image signals.

More specifically, the image sensor 1 has a circuit configuration as shown in FIG. 1, for instance. Referring to FIG. 1, the image sensor 1 includes a pixel section 2, a vertical scanning circuit 3, a first horizontal scanning circuit 4, a second horizontal scanning circuit 5, a first readout circuit section 6, and a second readout circuit section 7.

The pixel section 2 has the multitude of pixels 21 arranged in a matrix pattern, and photoelectrically converts the subject light into image signals in accordance with the amount of the subject light for outputting the image signals. A detailed arrangement of each pixel 21 is described later. The pixel section 2 has a load circuit 22. The load circuit 22 is equipped with a certain number of constant current loads 221 having load transistors Qa. Each of the load transistors Qa serves as an electron load which is operated in response to application of a load voltage i.e. a signal VD to a gate thereof. The signal VD controls the potential of the load transistor Qa so that the potential lies in an operation range of a source follower amplifier to be described later. A signal VPS indicates a voltage to be applied to a source of the load transistor Qa.

The vertical scanning circuit 3 is a vertical shift register for performing vertical scanning with respect to the pixels 21 i.e. all the pixel rows in the pixel section 2, and sequentially scans row selection signal lines 211 corresponding to the pixels 21 row by row. The first horizontal scanning circuit 4 and the second horizontal scanning circuit 5 each is a horizontal shift register for performing horizontal scanning with respect to the pixels 21 in the pixel section 2, and sequentially scans vertical signal lines 212 i.e. column selection signal lines or output signal lines column by column. The first horizontal scanning circuit 4 and the second horizontal scanning circuit 5 each performs column selection with respect to the pixels 21 in the pixel section 2. The first horizontal scanning circuit 4 performs horizontal scanning with respect to a linear characteristic output from each of the pixels 21, and the second horizontal scanning circuit 5 performs horizontal scanning with respect to a logarithmic characteristic output i.e. a logarithmic compression characteristic output from each of the pixels 21. An electric power is supplied to each of the pixels 21 by a power source line (not shown). Also, the pixels 21 are connected to a signal line other than the aforementioned signal lines e.g. a clock signal line.

The first readout circuit 6 is a circuit for sequentially reading out image signals i.e. linear output data obtained by a linear characteristic output, which is extracted from the pixels 21 in a certain pixel row scanned by the vertical scanning circuit 3 to the corresponding vertical signal line 212 in accordance with horizontal scanning by the first horizontal circuit 4, pixel by pixel. Similarly to the first readout circuit 6, the second readout circuit 7 is a circuit (also, called as a "horizontal readout circuit") for sequentially reading out image signals i.e. logarithmic output data obtained by a logarithmic characteristic output, which is extracted from the pixels 21 in a certain pixel row scanned by the vertical scanning circuit 3 to the corresponding vertical signal line 212 in accordance with horizontal scanning by the second horizontal scanning circuit 5, pixel by pixel. Thus, in this embodiment, the image sensor 1 has the readout circuits 6 and 7 individually with respect to each of the different photoelectric conversion characteristics of the pixels 21 with respect to all the pixel columns in the pixel section 2. In other words, the image sensor 1 has the first readout circuit 6 and the second readout circuit

7 individually for the linear characteristic output and the logarithmic characteristic output. The first readout circuit 6 serves as a sample-and-hold circuit for sampling an image signal and a noise signal by the linear characteristic output; and the second readout circuit 7 serves as a sample-and-hold circuit for sampling an image signal and a noise signal by the logarithmic characteristic output, respectively.

More specifically, the first readout circuit 6 includes a sample-and-hold circuit 61 and an amplifier 62 for linear characteristic output. The sample-and-hold circuit 61 is constituted of a certain number of signal sample-and-hold circuits 611 and a certain number of noise sample-and-hold circuits 612. The signal sample-and-hold circuits 611 each samples an inputted analog image signal, and temporarily holds the value of the sampled image signal. The signal sample-and-hold circuits 611 each includes a signal sample-and-hold switch Sa1 and a signal sample-and-hold capacitor Ca1, and realizes a signal sample-and-hold function by charging the signal sample-and-hold capacitor Ca1, retaining the charged potential, and discharging the signal sample-and-hold capacitor Ca1 in accordance with an on/off operation of the signal sample-and-hold switch Sa1. The noise sample-and-hold circuits 612 each samples an inputted noise, i.e. an inputted noise signal, and temporarily holds the value of the sampled noise signal. The noise sample-and-hold circuits 612 each includes a noise sample-and-hold switch Sa2 and a noise sample-and-hold capacitor Ca2, and realizes a noise sample-and-hold function by charging the noise sample-and-hold capacitor Ca2, retaining the charged potential, and discharging the noise sample-and-hold capacitor Ca2 in accordance with an on/off operation of the noise sample-and-hold switch Sa2.

The amplifier 62 is arranged at a position on an output end of a horizontal signal line 621 along which the signals are outputted from the sample-and-hold circuit 61 i.e. at a position on an extension of the horizontal signal line 621. The amplifier 62 has a function of removing a noise component resulting from sensitivity variation in each of the pixels 21, and amplifies the signal of each pixel 21 in an analog status. In other words, the amplifier 62 is an analog amplifier or a difference amplifier, and has a gain adjustment function of amplifying a signal by an analog gain. Specifically, the noise removal function is a function of obtaining an image signal whose potential in a floating diffusion (FD) is reset by a reset gate i.e. a transistor T11 in each pixel 21 and a potential variation in the floating diffusion is removed by obtaining a difference between an image signal and a noise signal in a linear characteristic output obtained by a sample-and-hold operation of the sample-and-hold circuit 61. Image data i.e. image signals outputted from the amplifier 62 after noise removal and gain adjustment are inputted to a processor provided posterior to the image sensor 1 pixel by pixel.

The expression that the amplifier 62 is arranged at the position on the extension of the horizontal signal line 621" means that the amplifier 62 is connected to the output end of the horizontal signal line 621, or the amplifier 62 is arranged at a position on the extension extending from the horizontal signal line 621 to the processor provided posterior to the image sensor 1. Alternatively, the amplifier 62 may be arranged at a position on the horizontal signal line 621 i.e. within the first readout circuit 6. A paired signal sample-and-hold circuit 611 and noise sample-and-hold circuit 612 in the sample-and-hold circuit 61 is sometimes called as a vertical output circuit 610 when needed. The sample-and-hold circuit 61 includes a certain number of vertical output circuits 610 corresponding to the pixel columns i.e. the vertical signal lines 212.

The second readout circuit 7 includes a sample-and-hold circuit 71 and a difference amplifier 72 for logarithmic characteristic output. Similarly to the sample-and-hold circuit 61, the sample-and-hold circuit 71 is constituted of a certain number of signal sample-and-hold circuits 711 and a certain number of noise sample-and-hold circuits 712. The signal sample-and-hold circuits 711 and the noise sample-and-hold circuits 712 have substantially the same configuration as the signal sample-and-hold circuits 611 and the noise sample-and-hold circuits 612, respectively. Specifically, the signal sample-and-hold circuits 711 each includes a signal sample-and-hold switch Sb1 and a signal sample-and-hold capacitor Cb1, and realizes a signal sample-and-hold function by charging the signal sample-and-hold capacitor Cb1, retaining the charged potential, and discharging the signal sample-and-hold capacitor Cb1 in accordance with an on/off operation of the signal sample-and-hold switch Sb1. The noise sample-and-hold circuits 712 each includes a noise sample-and-hold switch Sb2 and a noise sample-and-hold capacitor Cb2, and realizes a noise sample-and-hold function by charging the noise sample-and-hold capacitor Cb2, retaining the charged potential, and discharging the noise sample-and-hold capacitor Cb2 in accordance with an on/off operation of the noise sample-and-hold switch Sb2. Similarly to the amplifier 62, the amplifier 72 is arranged at a position on an extension of a horizontal signal line 721, or on the horizontal signal line 721, and removes a noise component resulting from sensitivity variation in each pixel 21 with respect to an image signal and a noise signal in logarithmic characteristic output obtained by a sample-and-hold operation of the sample-and-hold circuit 71, and amplifies the signal of each pixel 21 in an analog status i.e. performs gain adjustment.

Similarly to the sample-and-hold circuit 61 for linear characteristic output, a paired signal sample-and-hold circuit 711 and noise sample-and-hold circuit 712 in the sample-and-hold circuit 71 is sometimes called as a vertical output circuit 710 when needed. The sample-and-hold circuit 71 includes a certain number of vertical output circuits 710 corresponding to the pixel columns i.e. the vertical signal lines 212.

Unillustrated output signal lines are respectively connected to the first readout circuit 6 and the second readout circuit 7. The output signal lines are signal lines extending from the image sensor 1 to be described later to the processor provided posterior to the image sensor 1. In the example shown in FIG. 1, the output signal lines are connected to the amplifiers 62 and 72, respectively. The characteristic outputs are individually outputted to the processor provided posterior to the image sensor 1 by the output signal lines. As far as a function substantially equivalent to the function of the arrangement of the image sensor 1 shown in FIG. 1 is obtained, any arrangement may be applied. In the embodiment, the image sensor 1 is configured in such a manner that the pixels 21 are arranged two-dimensionally. Alternatively, the image sensor 1 may be a line sensor configured in such a manner that the pixels 21 are arranged one-dimensionally in a line.

Figure 2:
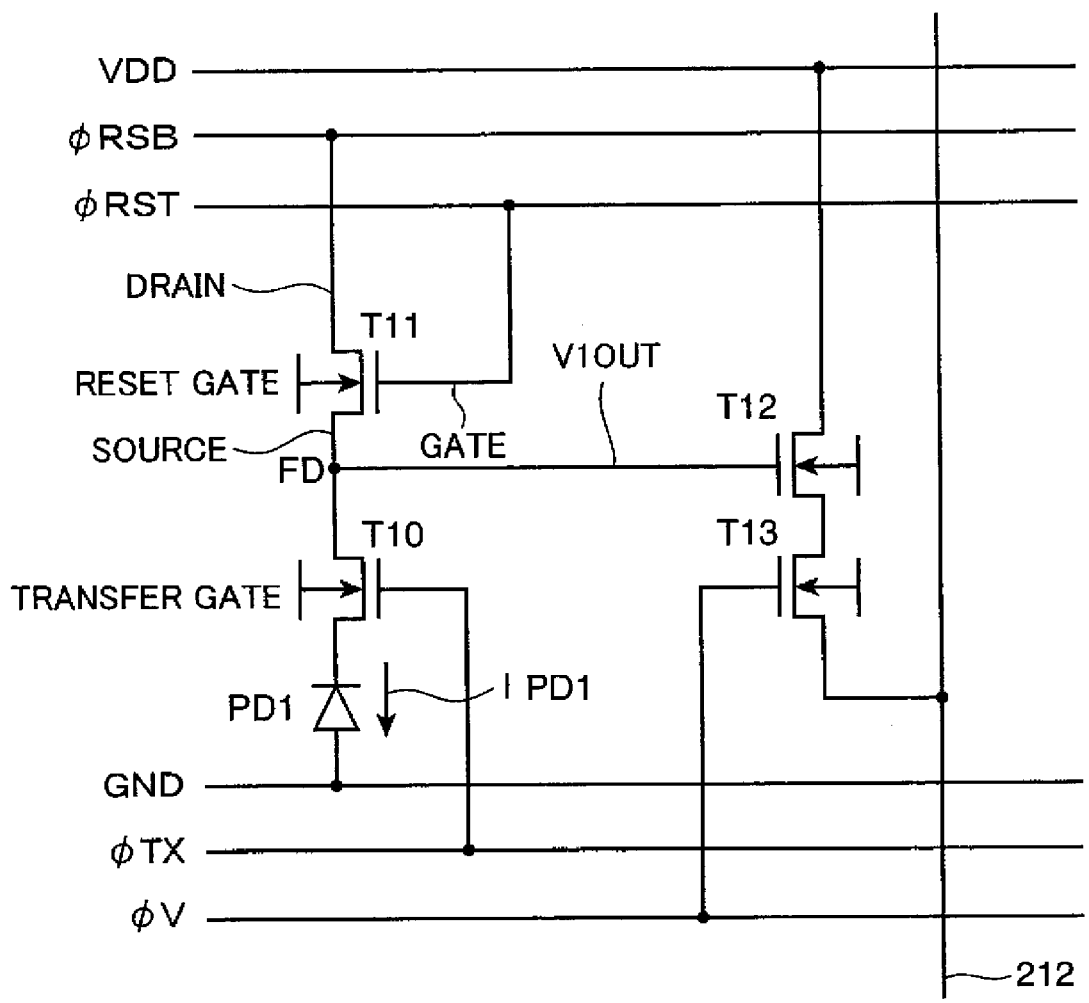
FIG. 2 is a diagram showing an example of a circuit configuration of each pixel of the image sensor.

FIG. 2 is a diagram showing an example of a circuit configuration of each pixel 21. Each pixel 21 includes a photodiode PD1, transistors T10, T11, T12, and T13 i.e. MOSFETs (Metal Oxide Semiconductor Field Effect Transistors), and an FD (Floating Diffusion). The transistors T10 through T13 each is an N-channel MOSFET in this embodiment. Alternatively, a circuit with a P-channel MOSFET may be used. Symbols VDD, φRSB, φRST, φTX, and φV indicate signals i.e. voltages to be applied to the transistors, and GND indicates the ground.

The photodiode PD1 is a photoelectric converter i.e. a photosensitive element, and generates an electric signal i.e. a photocurrent IPD1 commensurate with the amount of incident light from a subject. The transistor T12 as an amplifier transistor, and a constant current load 51 in pair constitute a source follower amplifier for amplifying a source follower, and amplifies a voltage V1OUT, which will be described later. The transistor T13 is a transistor for use in reading out signals, and is operated as a switch which is turned on and off in accordance with the voltage i.e. the signal φV to be applied to the gate thereof. The source of the transistor T13 is connected to the corresponding vertical signal line 212. When the transistor T13 is turned on, a current amplified by the transistor T12 flows to the vertical signal line 212 as an output current. The transistor T10 is operated as a switch which is turned on and off in accordance with the voltage to be applied to the gate thereof. The transistor T10 functions as a transfer gate for switching over between transfer and non-transfer of the photocurrent IPD1 i.e. an electric charge generated in the photodiode PD1 to the FD in accordance with an on/off operation corresponding to high/low of the gate potential.

The photocurrent IPD1 generated in the photodiode PD1 flows to a parasitic capacitance of the photodiode PD1 to accumulate the electric charge, and a voltage in accordance with the amount of the accumulated charge is generated. In this condition, if the transistor T10 is in an on-state, an electric charge i.e. a negative charge accumulated in the parasitic capacitance is moved to the FD. The FD is a charge retainer for temporarily retaining a charge, and serves as a capacitor for converting the retained charge into a voltage. The transistor T11 as a reset gate transistor serves as a reset gate for switching over between application and non-application of a reset bias to the FD in accordance with an on/off operation corresponding to high/low of the gate voltage of the transistor T11. A drain in the transistor T11 is also called as a reset drain. It is possible to use any circuit other than the circuit shown in FIG. 2, as far as the circuit has substantially the same function as the function of the circuit shown in FIG. 2.

A logarithmic characteristic output is obtained by setting the gate voltage of the transistor T10 as a transfer transistor or the gate voltage of the transistor T11 as a reset transistor shown in FIG. 2 to a mid potential when the photoelectric converter i.e. the photodiode PD1 is in a charge accumulation period. This operation is described in detail in the following.

Figure 3:
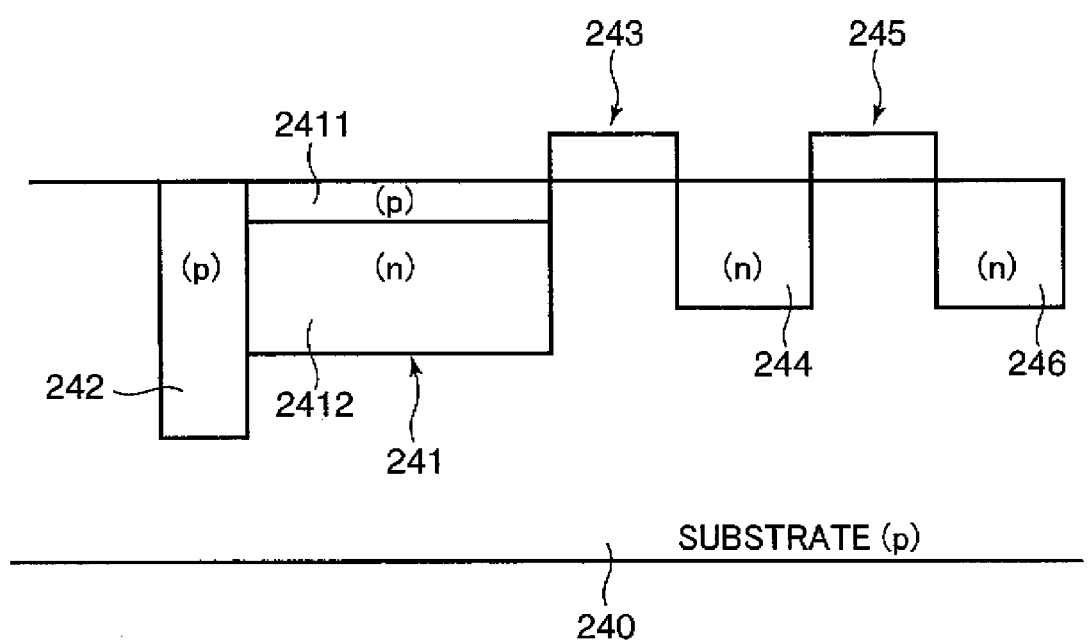
FIG. 3 is a cross-sectional view schematically showing a portion of a pixel in the vicinity of a photoelectric converter.

FIG. 3 is a cross-sectional view schematically showing a portion of the pixel 21 in the vicinity of the photoelectric converter. More specifically, FIG. 3 is a diagram schematically showing a cross-section of a portion of the pixel 21 including the photodiode PD1, the transistor T10, the FD, and the transistor T11. The pixel cross-section shown in FIG. 3 includes a p-type silicon substrate 240, a photoelectric converter 241 as an embedded photodiode PD1 comprised of a p-type region 2411 and an n-type region 2412, a pixel separating region 242 for use in separating the adjoining pixels from each other, a transfer gate 243 corresponding to the transistor T10, a floating node 244 corresponding to the FD, a reset gate 245 corresponding to the transistor T11, and a reset drain 246 corresponding to the transistor T11. The floating node 244 is connected to the transistor T12 as an amplifier transistor for amplifying an accumulated charge i.e. a voltage of the floating node 244 to output the amplified voltage. Use of the embedded photodiode as the photoelectric converter 241 is advantageous in suppressing generation of a dark current.

Figure 5A:
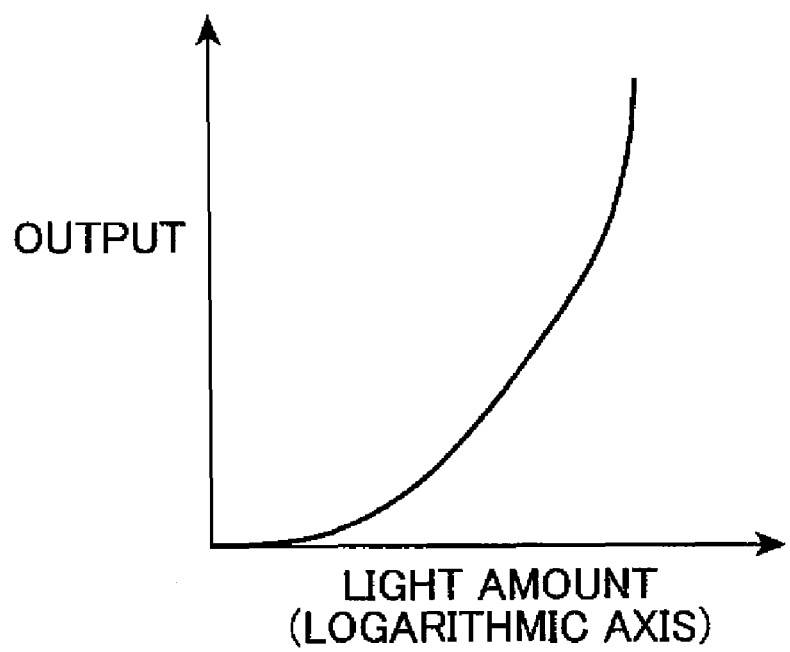
Figure 5B:
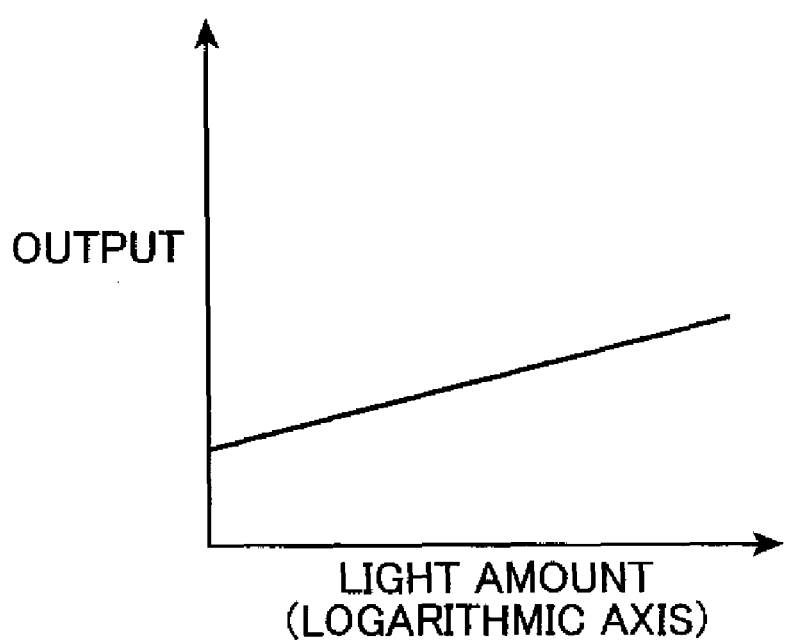

FIGS. 4A and 4B are potential distribution charts schematically showing a potential in the pixel cross section shown in FIG. 3. FIG. 4A shows a case that a pixel signal is outputted with a linear characteristic in proportion to the light amount in a state that the transfer gate 243 is closed to increase the potential of the transfer gate 243. FIG. 4B shows a case that a pixel signal is outputted with a logarithmic characteristic that the signal is logarithmically compressed in accordance with the light amount in a state that the potential of the transfer gate 243 is set to a mid potential. FIGS. 5A and 5B are diagrams each showing a photoelectric conversion characteristic, wherein FIG. 5A shows a photoelectric conversion characteristic that a pixel signal is outputted with a linear characteristic, and FIG. 5B shows a photoelectric conversion characteristic that a pixel signal is outputted with a logarithmic characteristic.

An image sensing operation concerning the linear characteristic output and the logarithmic characteristic output shown in FIGS. 4A and 4B is described referring to FIG. 6. FIG. 6 shows an example of a timing chart in the case where an image sensing operation is performed by a pixel 21. In particularly, FIG. 6 is a timing chart on a signal readout operation i.e. a charge sweep operation from each pixel 21 during a horizontal blank period. Specifically, FIG. 6 shows drive pulses i.e. drive signals to be applied to the respective components of the pixel 21 for sampling a linear characteristic output and a logarithmic characteristic output. Referring to FIG. 6, the reset pulse indicates a drive pulse to be applied to the reset gate 245 corresponding to +RST, the transfer pulse indicates a drive pulse to be applied to the transfer gate 243 corresponding to φTX, a noise sample-and-hold pulse indicates a drive pulse to be applied to the noise sample-and-hold circuit 612 (712), and the signal sample-and-hold pulse indicates a drive pulse to be applied to the signal ample-and-hold circuit 611 (711). In this embodiment, considering the polarity of the N-channel MOSFET, in the case where the drive pulse is set to high level (Hi), the N-channel MOSFET is turned on, and in the case where the drive pulse is set to low level (Low), the N-channel MOSFET is turned off.

The horizontal blank period is a period from the point of time when a data readout operation with respect to a certain pixel column in the pixel section 2 is completed to the point of time when a data readout operation with respect to a succeeding pixel column is started. Specifically, the horizontal blank period is a period from the point of time when data is extracted from the pixels 21 in a certain pixel row and transferred to the first readout circuit 6 or the second readout circuit 7 via the corresponding vertical signal line 212 to the point of time when data transfer is started with respect to a succeeding pixel row. In other words, the horizontal blank period is a period when a horizontal scanning operation by the first horizontal scanning circuit 4 or the second horizontal scanning circuit 5 is not performed.

Referring to FIG. 6, first, in the case where the transfer pulse is turned off i.e. set to Low at the timing 301, as shown in FIG. 4A, the transfer gate 243 is closed, and is brought to a low potential condition. In this case, the photoelectric converter 241 is in a charge accumulation period i.e. an exposure period for linear characteristic output, when electric charges are accumulated in the photoelectric converter 241. Then, at the timing 302 before the charge accumulation period is ended, the reset pulse is turned on i.e. set to Hi. Thereby, the reset gate 245 is opened, and is brought to a low potential condition, whereby the potential of the floating node 244 is set equal to the reset drain potential of the reset drain 246. Then, at the timing 303, the reset pulse is turned off to lower the potential of the reset gate 245. Thereafter, at the timing 304, the noise sample-and-hold pulse is turned on to sample-and-hold the reset drain potential i.e. a noise voltage in a linear characteristic, as noise. After finishing the sample-andhold operation of noise, at the timing 305, the transfer pulse is turned on to increase the potential of the transfer gate 243. Specifically, electric charges accumulated in the photoelectric converter 241 during the charge accumulation period are transferred to the floating node 244 by increasing the potential of the transfer gate 243 to e.g. a level slightly higher than the potential P1 (see FIG. 4A), specifically, the bottom potential of the photoelectric converter 241. Thereafter, at the timing 306, the transfer pulse is turned off to lower the potential of the transfer gate 243, and at the timing 307, the signal sample-and-hold pulse is turned on. Thereby, the floating node potential of the floating node 244 is sampled-and-held as a linear characteristic output in which the signal is amplified by the transistor T12. Thus, a sampling operation concerning the linear characteristic output is completed.

Subsequently, at the timing 311, the potential of the transfer pulse is set to the mid potential M to increase the potential of the transfer gate 243 to the potential P2 (see FIG. 4A). Thereby, the pixel 21 is operative to perform logarithmic compression. The mid potential M is an intermediate potential between the potential corresponding to Hi and the potential corresponding to Low. The logarithmic compression is performed during a period X1 when the transfer pulse is kept to the mid potential M.

More specifically, in the case where a difference between the potential of the photoelectric converter 241 and the potential of the transfer gate is set equal to or lower than a predetermined threshold voltage, a logarithmic characteristic output that a signal is logarithmically compressed in accordance with the light amount is obtained. In this case, as shown in FIG. 4B, electric charges accumulated in the photoelectric converter 241 flow to the floating node 244. In the logarithmic compression, a logarithmically compressed value with respect to a photocurrent can be converted into a voltage instantaneously at each point of time. This does not require a relatively long accumulated period X2 as an integration period, as required in a linear characteristic output, and enables to secure an output with a relatively short period e.g. the period X1. The linear characteristic has an integration characteristic, and an output is performed based on electric charges accumulated in a relatively long period. On the other hand, the logarithmic characteristic does not have an integration characteristic, and an instantaneous value of electric charge is outputted.

Thereafter, at the timing 312, the transfer pulse is temporarily turned off, and at the timing 313, the reset pulse is turned on to increase the reset potential of the reset gate 245. Thereby, the potential of the floating node 244 is reset again. In other words, the potential of the floating node 244 is set to the reset drain potential again. Then, at the timing 314, the reset pulse is turned off to lower the potential of the reset gate 245. Thereafter, at the timing 315, the noise sample-and-hold pulse is turned on to sample-and-hold the reset drain potential i.e. a noise potential in a logarithmic characteristic, as noise. After finishing the sample-and-hold operation of noise, at the timing 316, the transfer pulse is turned on to increase the potential of the transfer gate 243 to the potential P1 shown in FIG. 4A. Thus, electric charges accumulated in the photoelectric converter 241 i.e. a logarithmically compressed voltage is transferred to the floating node 244. Thereafter, at the timing 317, the transfer pulse is turned off to lower the potential of the transfer gate 243, and at the timing 318, the signal sample-and-hold pulse is turned on to sample-and-hold the floating node potential of the floating node 244, as a logarithmic characteristic output, in which the signal is amplified by the transistor T12. Thus, a sampling operation concerning the logarithmic characteristic output is completed.

The sampled noise i.e. the sampled noise signal and the sampled signal i.e. the sampled image signal in the linear characteristic output are respectively held in the noise sample-and-hold capacitor Ca2 and the signal sample-and-hold capacitor Ca1 shown in FIG. 1. Likewise, the sampled noise signal and the sampled image signal in the logarithmic characteristic output are respectively held in the noise sample-and-hold capacitor Cb2 and the signal sample-and-hold capacitor Cb1 shown in FIG. 1. Thereafter, by performing a horizontal scanning operation by the first horizontal scanning circuit 4 and the second horizontal scanning circuit 5, the sampled-and-held noise signals and the sampled-and-held image signals in the linear characteristic output and the logarithmic characteristic output are respectively inputted to the amplifiers 62 and 72 via the horizontal signal lines 621 and 721, followed by noise removal and analog amplification by the amplifiers 62 and 72 for outputting the amplified signals.

As shown in FIG. 1, a linear characteristic output and a logarithmic characteristic output are simultaneously performed by simultaneously driving the first horizontal scanning circuit 4 and the second horizontal scanning circuit 5 which are disposed as opposed to each other vertically with respect to the pixel section 2. This arrangement enables to output a linear characteristic output and a logarithmic characteristic output individually within one frame period, while suppressing lowering of the frame rate.

Figure 7:
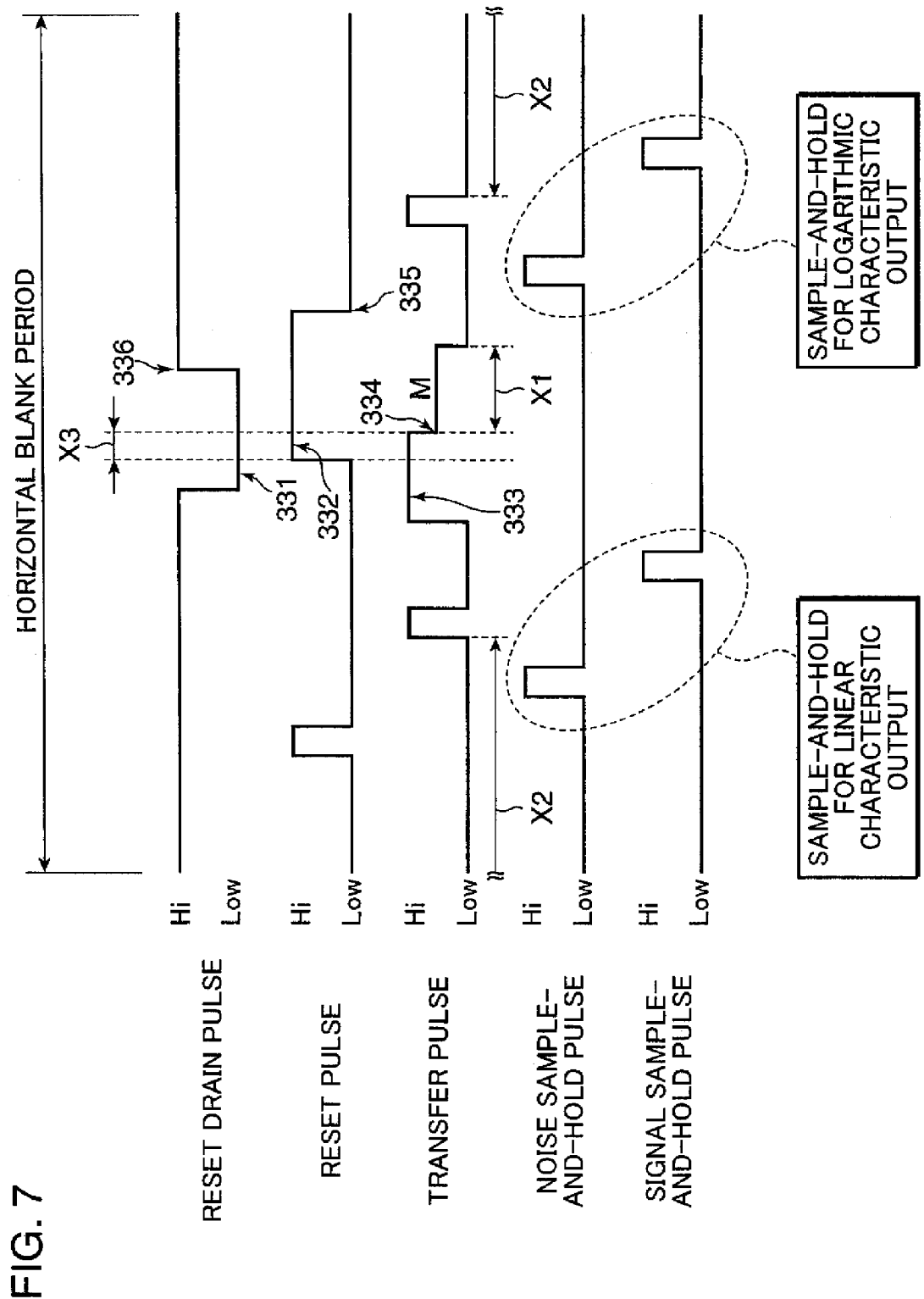
FIG. 7 is a timing chart as a modification of the timing chart shown in FIG. 6.

The drive pulses to be applied to the respective components of the pixel 21 to obtain the linear characteristic output and the logarithmic characteristic output may be the ones as shown in e.g. FIG. 7. FIG. 7 is a timing chart in the case where the photoelectric converter 241 is initialized with a low potential before logarithmic compression i.e. logarithmic compression characteristic driving is performed. In FIG. 7, a reset drain pulse, as a drive pulse to be applied to the reset drain 246, is shown, in addition to the drive pulses shown in FIG. 7. In the modification shown in FIG. 7, before the potential of the transfer pulse is set to the mid potential M to perform logarithmic compression as in the embodiment, the reset drain pulse is turned off at the timing 331, the reset pulse is turned on at the timing 332, and the transfer pulse is turned on at the timing 333. This enables to secure a period X3 when the reset drain potential of the reset drain 246 is set to a low potential, and the potentials of the transfer gate 243 and the reset gate 245 are lowered. By performing the above operation, the photoelectric converter 241 is initialized with the low potential of the reset drain 246. In this arrangement, the photoelectric converter 241 is in a low potential before the potential of the transfer pulse is set to the mid potential M to start logarithmic compression. Thus, logarithmic compression can be started from a condition that the photoelectric converter 241 is in a low potential. In this way, a DC (direct-current) component of the logarithmic characteristic output can be controlled to an intended value by controlling the initialization potential i.e. the low potential level of the photoelectric converter 241.

After lapse of the period X3, the potential of the transfer pulse is lowered from Hi to the mid potential M at the timing 334. The reset pulse is turned on at the timing 332, and then is turned off at the timing 335 after lapse of the period XL when the potential of the transfer pulse is kept to the mid potential M. The above operation corresponds to an operation of turning off the reset pulse at the timing 314 before the noise sample-and-hold pulse is turned on at the timing 315. The reset drain pulse is returned to an on-state from an off-state at the timing 336 before the period X1 when the potential of the transfer pulse is kept to the mid potential M elapses.

Figure 16:
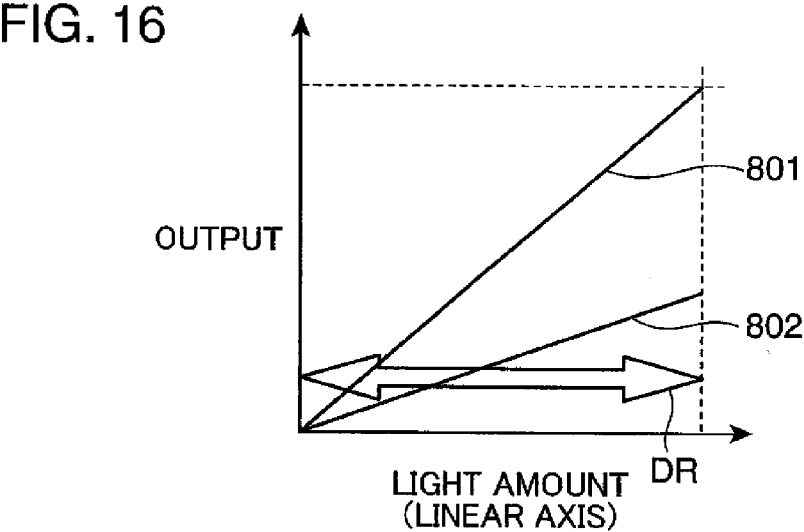
FIG. 16 is a graph showing a modification of a photoelectric conversion characteristic of the image sensor.
Figure 17:
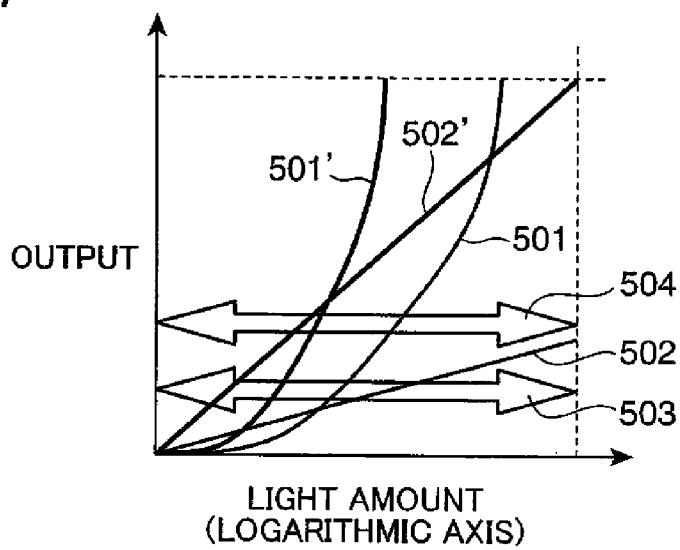
FIG. 17 is a graph for describing how a dynamic range is secured in the embodiment.
Figure 18:
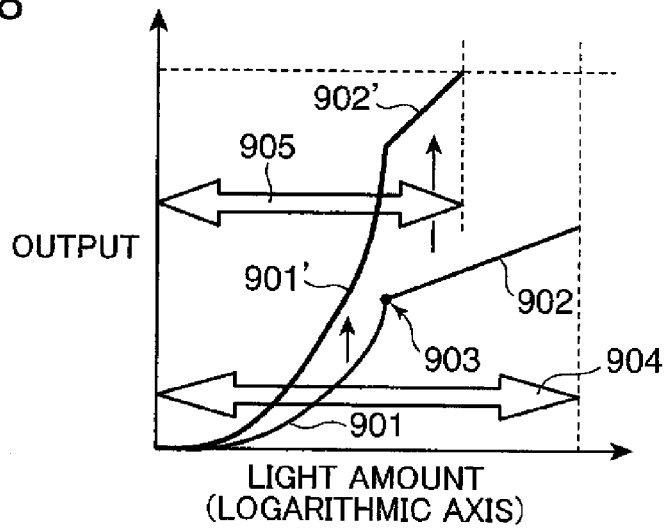
FIG. 18 is a graph for describing a dynamic range obtained by using a conventional solid-state image sensing device.

As described above, in the solid-state image sensing device capable of outputting both of a linear characteristic and a logarithmic characteristic, the output circuit for outputting image data from the pixels includes output circuit portions individually prepared for both of the characteristics. Thus, since the linear characteristic output and the logarithmic characteristic output can be performed in one frame period, even if an analog gain is increased with respect to at least one of the characteristics, the entirety of the dynamic range corresponding to the photoelectric conversion characteristic comprised of the linear characteristic and the logarithmic characteristic can be secured, thereby enabling to perform an image sensing operation with a wide dynamic range. The above arrangement enables to handle the linear characteristic and the logarithmic characteristic individually, thereby enabling to perform gain control with respect to each of the characteristics. As shown in FIG. 17, for instance, let it be assumed that a linear characteristic 501 and a logarithmic characteristic 502 are prepared as initial characteristics. Even if the linear characteristic 501 is turned into a linear characteristic 501' by increasing the gain of one of the characteristics e.g. the linear characteristic 501, the entirety of a dynamic range corresponding to a synthesis of a linear characteristic and a logarithmic characteristic does not change between a dynamic range 503 before gain increase and a dynamic range 504 after gain increase. It should be noted that the horizontal axis in FIGS. 17 and 18 are indicated by logarithmic expression, whereas the horizontal axis in FIG. 16 is indicated by linear expression. Alternatively, the logarithmic characteristic 502 may be changed into a logarithmic characteristic 502' by increasing the gain of the logarithmic characteristic 502, as the gain of the linear characteristic 501 is increased. As compared with a method for outputting either one of the characteristics in one frame period, use of the method for outputting both of the characteristics in one frame period enables to obtain outputs of both of the characteristics without lowering the frame rate. Thus, the arrangement enables to perform an image sensing operation with a high frame rate, while securing an intended gradation with respect to each of the characteristic regions, and securing a wide dynamic range as a whole.

Figure 8:
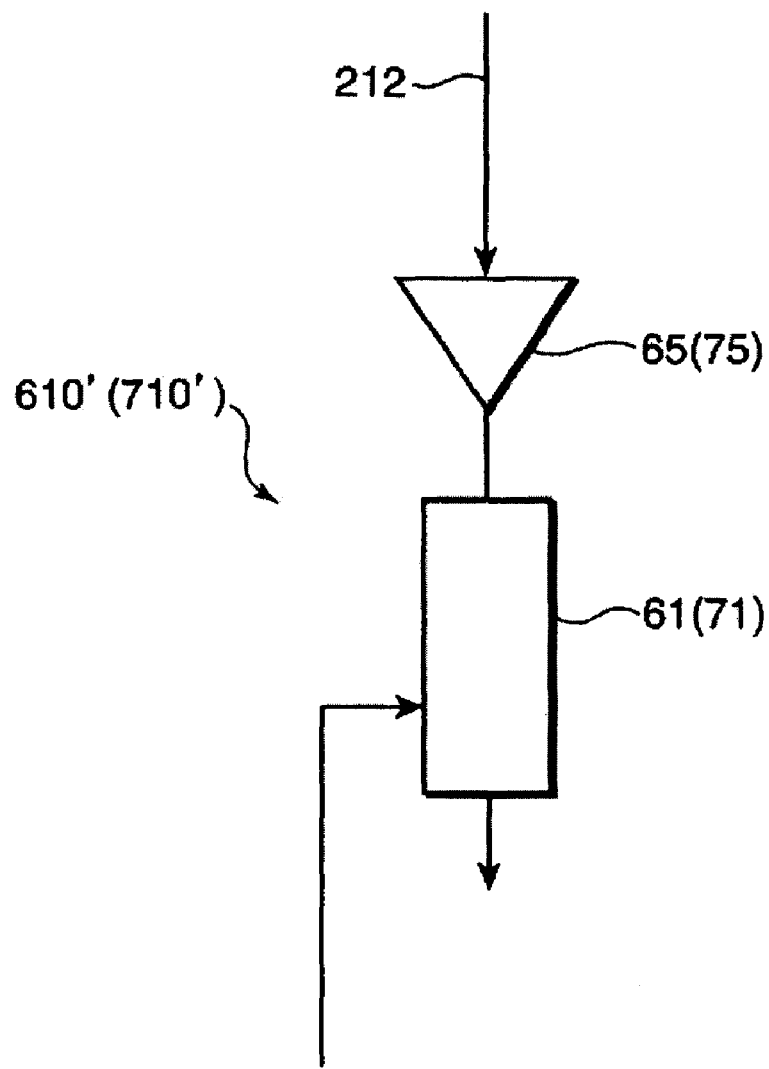
FIG. 8 is a diagram schematically showing a vertical output circuit shown in FIG. 1 in the case where an analog amplifier is provided in the vertical output circuit.

In the embodiment, an analog amplifying section i.e. the amplifier 62 (72) is provided at a position on the extension of the horizontal signal line 621 (721). Alternatively, the analog amplifying section may be provided in a vertical output circuit e.g. the vertical output circuit 610 (710). For instance, as shown in FIG. 8, each of vertical output circuits 610' for linear characteristic output corresponding to the vertical output circuits 610 may include a sample-and-hold circuit 61 comprised of a signal sample-and-hold circuit 611 and a noise sample-and-hold circuit 612 in pair, and an analog amplifier 65 connected to the sample-and-hold circuit 61. The analog amplifier 65 is connected to a corresponding vertical signal line 212 from a pixel section 2. A column selection pulse is inputted from a first horizontal scanning circuit 4 to the sample-and-hold circuit 61. Similarly to the circuit configuration for linear characteristic output, in the circuit configuration for logarithmic characteristic output, each of vertical output circuits 710' corresponding to the vertical output circuits 710 may include a sample-and-hold circuit 71 comprised of a signal sample-and-hold circuit 711 and a noise sample-and-hold circuit 712 in pair, and an analog amplifier 75 connected to the sample-and-hold circuit 71. In FIG. 8, the analog amplifier 65 (75) is provided anterior to the sample-and-hold circuit 61 (71) i.e. on the side of the pixel section 2. Alternatively, the analog amplifier 65 (75) may be provided posterior to the sample-and-hold circuit 61 (71) i.e. on the side of the first horizontal scanning circuit 4.

Figure 9:
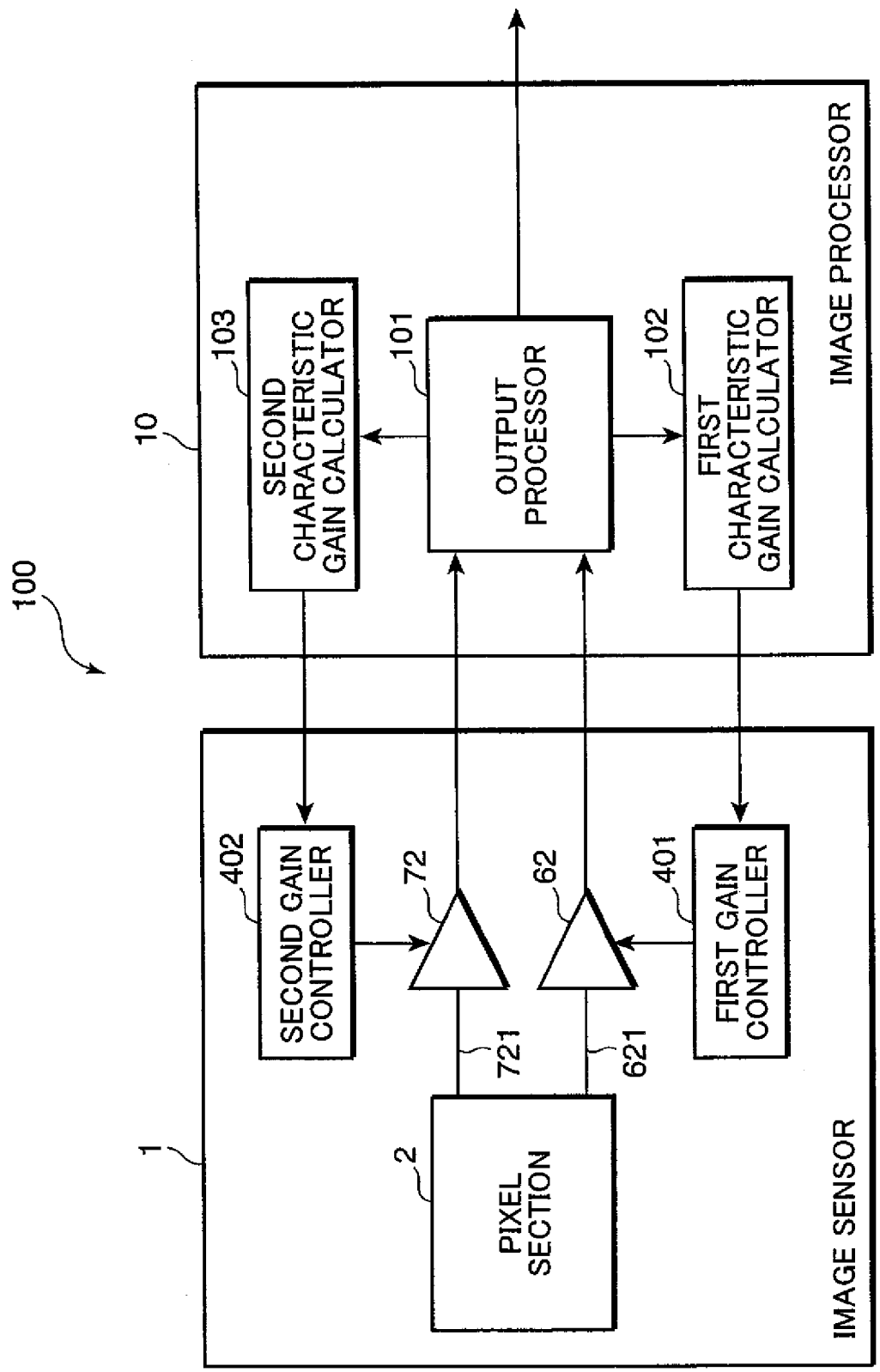
FIG. 9 is a block diagram showing an exemplified configuration of a system for performing an image processing operation with respect to different characteristic outputs outputted from the image sensor.

The image sensor 1 having the above arrangement is applicable to an image sensing system 100 having a block diagram schematically shown in FIG. 9, for instance. The image sensing system 100 includes the image sensor 1 for outputting the aforementioned two different characteristics, and an image processor 10 for processing image data outputted from the image sensor 1 with respect to each of the characteristics. In the image sensing system 100, the image sensor 1 further includes a first gain controller 401 and a second gain controller 402 in addition to the aforementioned constituent elements. In FIG. 9, the constituent elements of the images sensor 1 are not illustrated, except for the first gain controller 401, the second gain controller 402, the pixel section 2, and the amplifiers 62 and 72. The first gain controller 401 and the second gain controller 402 respectively control an analog gain of the amplifier 62 for linear characteristic output and an analog gain of the amplifier 72 for logarithmic characteristic output, based on gain information outputted from a first characteristic gain calculator 102 and a second characteristic gain calculator 103, which will be described later, i.e. perform gain adjustment. The image sensor 1 shown in FIG. 9 shows a case that the amplifiers 62 (72) is provided at a position on the extension of the horizontal signal line 621 (721).

The image processor 10 includes an output processor 101, the first characteristic gain calculator 102, and the second characteristic gain calculator 103. The output processor 101 receives an image signal having a linear characteristic i.e. linear image data outputted from the amplifier 62, and an image signal having a logarithmic characteristic i.e. logarithmic image data outputted from the amplifier 72, and performs a predetermined processing operation with respect to the image signals having the respective characteristics. More specifically, the processing operation includes an image processing operation such as color correction or white balance adjustment, and a synthesizing operation with respect to pixel signal data having the respective characteristics after the image processing operation. Image data obtained by the synthesizing operation is outputted from the output processor 101 to an unillustrated processor provided posterior to the output processor 101. The output processor 101 calculates e.g. assessment values concerning the gains in accordance with the linear image data and the logarithmic image data, respectively, and outputs the assessment values to the first characteristic gain calculator 102 and the second characteristic gain calculator 103, respectively. The assessment values outputted from the output processor 101 are respectively inputted to the first characteristic gain calculator 102 and the second characteristic gain calculator 103. In response to receiving the assessment values, the first characteristic gain calculator 102 and the second characteristic gain calculator 103 respectively calculate gains for the characteristics to output the calculated gains to the first gain controller 401 and the second gain controller 402, and output the gain information to the first gain controller 401 and the second gain controller 402 of the image sensor 1, respectively. The image sensing system 100 includes feedback systems individually prepared for the characteristics for feedback-outputting, to the amplifiers 62 and 72, the gain information on the characteristics, which have been obtained from the linear image data and the logarithmic image data outputted from the image sensor 1.

Figure 10:
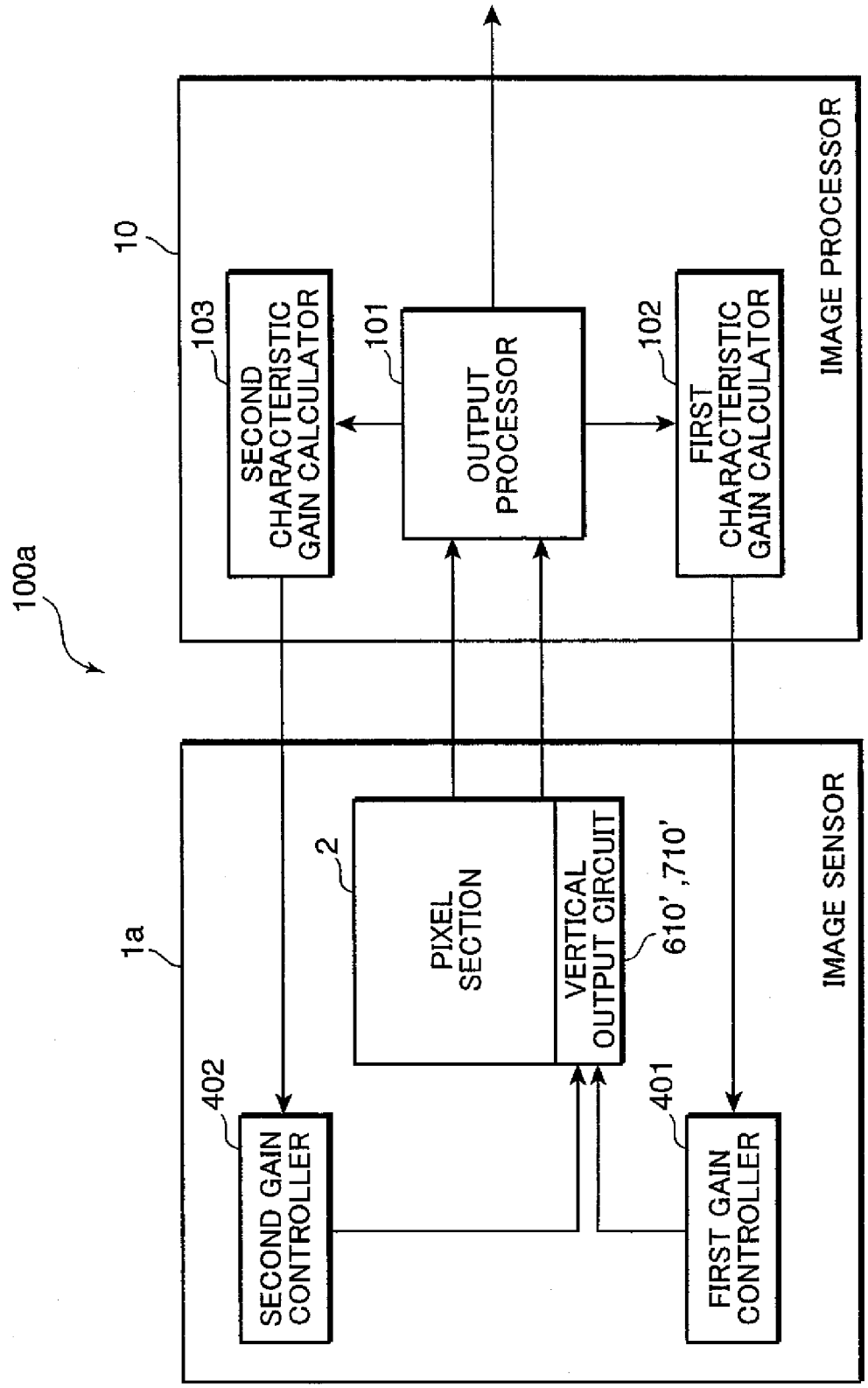
FIG. 10 is a block diagram showing a modification of the system configuration shown in FIG. 9.

FIG. 10 is a block diagram schematically showing an image sensing system 100a to which an image sensor 1a is applied. The image sensor 1a is constructed in such a manner that the analog amplifier 65 (75) shown in FIG. 8 is incorporated in the vertical output circuit 610' (710'). In FIG. 10, the vertical output circuit 610' (710') incorporated with the analog amplifier 65 (75) is shown in a lower part of the pixel section 2. The first gain controller 401 and the second gain controller 402 respectively control the gain of the analog amplifier 65 for linear characteristic output in the vertical output circuit 610' and the gain of the analog amplifier 75 for logarithmic characteristic output in the vertical output circuit 710'. After gain control and noise removal, linear image data and logarithmic image data outputted from the vertical output circuits 610' and 710' are inputted to the output processor 101. Thereafter, substantially the same processing operation as the aforementioned processing operation is performed. In the case of the image sensing system 100 shown in FIG. 9, since an analog amplifier is not provided in the vertical output circuit, designing i.e. layout on the respective components of the image sensor 1 is easy. On the other hand, in the case of the image sensing system 100a shown in FIG. 10, an analog amplifier is provided in the vertical output circuit. The analog amplifier can be arranged at a position closer to the pixel section 2 i.e. the pixels 21. This enables to suppress likelihood that noise may be superimposed on a signal outputted from the pixel 21 before the signal is inputted from the pixel 21 to the analog amplifier, thereby enabling to increase the S/N ratio in total.

As described above, the solid-state image sensing device of the embodiment i.e. the image sensor 1 (1a) includes: the pixel section 2 having two or more different photoelectric conversion characteristics, and adapted to output pixel signals having the photoelectric conversion characteristics; an analog amplifying section i.e. the amplifiers 62 and 72 or the analog amplifiers 65 and 75 for amplifying the pixel signals from the pixel section 2 in an analog status; and an output circuit i.e. the circuits of the image sensor 1 (1a) other than the pixel section 2 and the analog amplifying section, or the circuits 3 through 7 for controlling an analog gain with respect to each of the photoelectric conversion characteristics to amplify the pixel signals by the analog amplifying section so as to output the amplified pixel signals.

In the above arrangement, the pixel signals can be outputted individually with respect to each of the photoelectric conversion characteristics, and outputted in a state that the pixel signals are amplified by the respective analog gains. This enables to output the characteristics in an identical frame period. Also, even if the gain of either one of the characteristic output images is increased to increase the gradation, for instance, an image sensing operation with a relatively wide dynamic range can be performed, without reducing the dynamic range of an entire image obtained by synthesizing the characteristic output images. Also, as compared with a method for outputting either one of the characteristics in one frame period, use of the method for outputting both of the characteristics in one frame period enables to obtain outputs of both of the characteristics without lowering the frame rate. Thus, the arrangement enables to perform an image sensing operation with a high frame rate, while securing an intended gradation with respect to each of the characteristic regions, and securing a wide dynamic range as a whole.

Preferably, the output circuit includes the vertical signal lines 212 connected to the columns of the pixels 21 in the pixel section 2; a vertical output section i.e. the vertical output circuits 610, 710 connected to the vertical signal lines 212 for reading out the pixel signals from the pixels 21; and a horizontal shift register i.e. the first horizontal scanning circuit 4 and the second horizontal scanning circuit 5 for performing a column selecting operation with respect to the vertical output section. The vertical output section is internally provided with a predetermined number of sampling circuits individually provided with respect to the pixel signals having the photoelectric conversion characteristics.

In the solid-state image sensing device having the above arrangement, the pixel signals having the photoelectric conversion characteristics to be outputted from the pixel section 2 can be individually sampled with respect to each of the characteristics. Since the sampling circuits for the photoelectric conversion characteristics are individually provided in the vertical output section, the sampling circuits for the characteristics can be arranged in the vertical output section, without considering the number of vertical output circuits. This enables to sample the characteristic outputs with use of at least one vertical output section.

Preferably, the output circuit includes: the vertical signal lines 212 connected to the columns of the pixels 21 in the pixel section 2; a vertical output section i.e. the vertical output circuits 610, 710 connected to the vertical signal lines 212 for reading out the pixel signals from the pixels 21; and a horizontal shift register i.e. the first horizontal scanning circuit 4 and the second horizontal scanning circuit 5 for performing a column selecting operation with respect to the vertical output section. The vertical output section is constituted of a predetermined number of vertical output circuits individually provided with respect to the pixel signals having the photoelectric conversion characteristics, each of the vertical output circuits being internally provided with a sampling circuit.

In the solid-state image sensing device having the above arrangement, the pixel signals can be sampled by using the individual vertical output circuits with respect to each of the photoelectric conversion characteristics. Also, a paired vertical output circuit comprised of the vertical output circuit 610 and the vertical output circuit 710, or the first readout circuit 6 and the second readout circuit 7, is arranged as opposed to each other with respect to the pixel section 2. This enables to facilitate layout i.e. designing of the vertical output section.

Preferably, the sampling circuit is constituted of a sample-and-hold circuit i.e. the sample-and-hold circuits 61 and 71. This enables to easily realize a circuit for performing a sampling operation by a sample-and-hold circuit.

Preferably, the output circuit further includes a horizontal signal line i.e. the horizontal signal lines 621 and 721 connected to the vertical output section, and the analog amplifying section i.e. the amplifiers 62 and 72 is provided on the horizontal signal line, or on an extension of the horizontal signal line. This enables to facilitate a circuit configuration without providing an analog amplifying section in the vertical output section.

Preferably, the analog amplifying section i.e. the analog amplifiers 65 and 75 is provided in the vertical output section. This enables to suppress likelihood that noise may be superimposed on a signal line between the vertical output section and the analog amplifying section, in the case where the analog amplifying section is provided e.g. at a position outside the vertical output section, thereby enabling to increase the S/N ratio in total.

Preferably, the solid-state image sensing device having the above arrangement further includes output signal lines for individually outputting the pixel signals read out to the vertical output section with respect to each of the photoelectric conversion characteristics. This enables to eliminates the need of providing an arrangement that data is serially outputted with use of a single output signal line, thereby enabling to output the pixel signals individually with respect to each of the characteristics with a simplified arrangement.

Preferably, the solid-state image sensing device further includes a gain controlling section i.e. the first gain controller 401 and the second gain controller 402 for controlling the analog gain of the analog amplifying section. This enables to easily realize an arrangement of controlling the gain of the analog amplifying section with use of the gain controlling section.

In the solid-state image sensing device having the above arrangement, preferably, the output circuit controls the analog gain with respect to the pixel signals having the photoelectric conversion characteristics individually to output the amplified pixel signals in an identical frame period. This enables to output the pixel signals having the characteristics without lowering the frame rate.

In the solid-state image sensing device having the above arrangement, preferably, the output circuit is operative to, in one horizontal blank period, sample the pixel signal having one of the photoelectric conversion characteristics by a sampling circuit upon lapse of an integration period i.e. a charge accumulation period with respect to the one photoelectric conversion characteristic, and sample the pixel signal having the other one of the photoelectric conversion characteristics by the sampling circuit, following the sampling operation, to output the sampled pixel signal having the one photoelectric conversion characteristic and the sampled pixel signal having the other one photoelectric conversion characteristic in accordance with a column selecting operation by a horizontal shift register. This enables to easily realize an arrangement of outputting the pixel signals having the photoelectric conversion characteristics in the identical frame period.

Preferably, each of the pixels 21 includes: the photoelectric converter 241 for generating a photocurrent with respect to incident light to accumulate an electric charge; the floating node 244 for converting the electric charge accumulated in the photoelectric converter 241 into a voltage; an amplifier transistor i.e. the transistor T12 for amplifying the voltage of the floating node 244 to output the amplified voltage; the transfer gate 243; and the reset gate 245. With use of the pixel 21 having the above arrangement, the pixel signal having the logarithmic characteristic is outputted from the amplifier transistor by setting the potential of the transfer gate 243 to the mid potential M between the high potential and the low potential during an exposure period. This enables to easily realize an arrangement of performing a logarithmic characteristic output from the pixel 21.

In the solid-state image sensing device having the above arrangement, preferably, each of the pixels outputs the pixel signal having the logarithmic characteristic by, after the pixel signal having the linear characteristic is sampled, initializing a potential of the photoelectric converter with a predetermined potential i.e. a low potential, and increasing the initialized potential of the photoelectric converter to a potential defined by the potential of the transfer gate and an amount of the incident light. This enables to control a DC component of the logarithmic characteristic output to an intended value by controlling the initialization potential of the photoelectric converter i.e. the low potential level of the photoelectric converter.

Preferably, each of the pixels 21 includes: the photoelectric converter 241 for generating a photocurrent with respect to incident light to accumulate an electric charge; the floating node 244 for converting the electric charge accumulated in the photoelectric converter 241 into a voltage; an amplifier transistor i.e. the transistor T12 for amplifying the voltage of the floating node 244 to output the amplified voltage; the transfer gate 243; and the reset gate 245. With use of the pixel 21 having the above arrangement, the pixel signal having the logarithmic characteristic is outputted from the amplifier transistor by setting the potential of the reset gate 245 to the mid potential M between the high potential and the low potential during an exposure period. This enables to easily realize an arrangement of performing a logarithmic characteristic output from the pixel 21.

In the solid-state image sensing device having the above arrangement, preferably, each of the pixels 21 outputs the pixel signal having the logarithmic characteristic by, after the pixel signal having the linear characteristic is sampled, initializing the potential of the floating node 244 with a predetermined potential, and increasing the initialized potential of the floating node 244 to a potential defined by the potential of the reset gate 245 and an amount of the incident light. This enables to control a DC component of the logarithmic characteristic output to an intended value by controlling the initialization potential of the floating node 244 i.e. the low potential level of the floating node 244.

A method for driving a solid-state image sensing device of the embodiment i.e. the image sensor 1 (1a) provided with the pixel section 2 having two or more different photoelectric conversion characteristics and adapted to output pixel signals having the photoelectric conversion characteristics individually, and an analog amplifying section i.e. the amplifiers 62 and 72 or the analog amplifiers 65 and 75 for amplifying the pixel signals comprises an output step of controlling an analog gain with respect to each of the photoelectric conversion characteristics to output the pixel signals amplified by the analog amplifying section. The output step is a step of outputting the amplified pixel signals having the photoelectric conversion characteristics in an identical frame period.

The above arrangement enables to, in the output step, output the pixel signals having the photoelectric conversion characteristics in the identical frame period, the pixel signals being amplified by the analog amplifying section with use of the analog gain with respect to each of the photoelectric conversion characteristics. This enables to output the pixel signals having the characteristics without lowering the frame rate.

Preferably, the output step is a step of, in one horizontal blank period, sampling the pixel signal having one of the photoelectric conversion characteristics e.g. a linear characteristic upon lapse of an integration period with respect to the one photoelectric conversion characteristic, and sampling the pixel signal having the other one of the photoelectric conversion characteristics e.g. a logarithmic characteristic, following the sampling operation, to output the sampled pixel signal having the one photoelectric conversion characteristic and the sampled pixel signal having the other one photoelectric conversion characteristic in accordance with a column selecting operation by a horizontal shift register i.e. the first horizontal scanning circuit 4 and the second horizontal scanning circuit 5. This enables to easily realize a method for driving the pixel signals having the photoelectric conversion characteristics individually in the identical frame period.

An image sensing system of the embodiment i.e. the image sensing system 100 (100a) comprises: a solid-state image sensing device i.e. the image sensor 1 (1a) configured in such a manner as to output pixel signals having two or more photoelectric conversion characteristics individually; and the image processor 10 for performing an image processing operation individually with respect to the pixel signals having the photoelectric conversion characteristics to be outputted from the solid-state image sensing device, and performing a synthesizing operation with respect to pixel signal data having the photoelectric conversion characteristics after the individual image processing operation.

With use of the image sensing system having the above arrangement, it is easy to perform a predetermined processing operation to the pixel signals to be outputted from the solid-state image sensing device with respect to each of the characteristics e.g. an image processing operation of increasing the gain of a certain characteristic output image, and synthesizing the certain characteristic output image after the gain increase and the other characteristic output image for outputting a synthesized image.

Preferably, the image processor 10 includes the output processor 101 for performing a predetermined processing operation with respect to outputs having the photoelectric conversion characteristics from the solid-state image sensing device, and information relating to an analog gain with respect to each of the photoelectric conversion characteristics calculated based on the processing operation by the output processor 101 is inputted to the solid-state image sensing device. This arrangement enables to calculate the analog gain with respect to each of the characteristics based on the characteristic outputs from the solid-state image sensing device, and amplify the pixel signals in accordance with the calculated analog gain with respect to each of the characteristics by feedback controlling the analog gain information to the solid-state image sensing device for outputting the amplified pixel signals to the output processor 101. Thus, gain adjustment can be easily performed in such a manner that an intended image is obtained in accordance with an actual exposure operation i.e. an actual image sensing operation by the solid-state image sensing device, or imaging sensitivity control i.e. sensitivity correction can be performed without changing the imaging dynamic range.

Various arrangements may be added or altered, as far as such addition or alteration does not depart from the scope of the invention. For instance, the following modifications may be applied to the invention.

(A) In the embodiment, the image sensor 1 is provided with two readout circuits for the respective characteristic outputs e.g. the readout circuit 6 and the second readout circuit 7 with respect to the pixel section 2, as shown in FIG. 1, specifically, the vertical output circuits 610 for linear characteristic output and the vertical output circuits 710 for logarithmic characteristic output. Alternatively, a single readout circuit capable of performing a readout operation of both of the characteristic outputs may be used to perform the readout operation. Further alternatively, a circuit configuration other than the vertical output section constituted of paired vertical output circuits may be used. In the modification, vertical output circuits individually provided for the characteristic outputs may be arranged in a single readout circuit.

Figure 11:
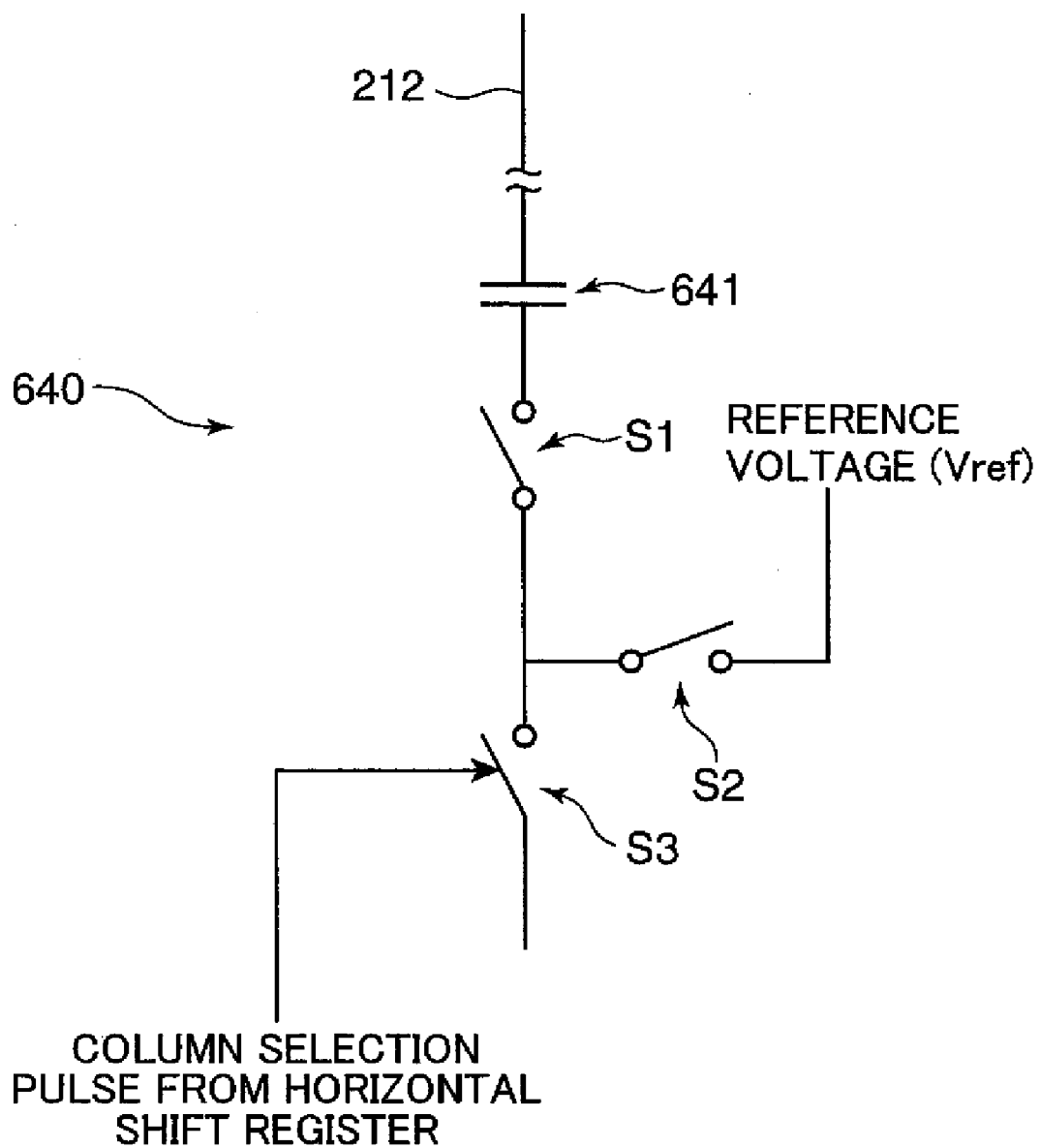
FIG. 11 is a diagram showing an example of a clamp circuit.

(B) In the embodiment, the sample-and-hold circuit 61 (71) is used as a circuit for reading out an image signal and a noise signal by linear characteristic output (logarithmic characteristic output) from each of the pixels 21. Alternatively, a clamp circuit 640 for linear characteristic output (logarithmic characteristic output) as shown in FIG. 11 may be used, in place of the sample-and-hold circuit 61 (71). The clamp circuit 640 includes a capacitor 641 connected to the corresponding vertical signal line 212, and switches S1, S2, and S3 for switching. With use of the clamp circuit 640, an image signal obtained by performing a difference operation between a noise signal, and an image signal to be inputted afterwards, is outputted to the first horizontal scanning circuit 4 (second horizontal scanning circuit 5). Since the readout circuit is constituted of the clamp circuit, the readout circuit can be easily configured by using the clamp circuit.

Figure 12:
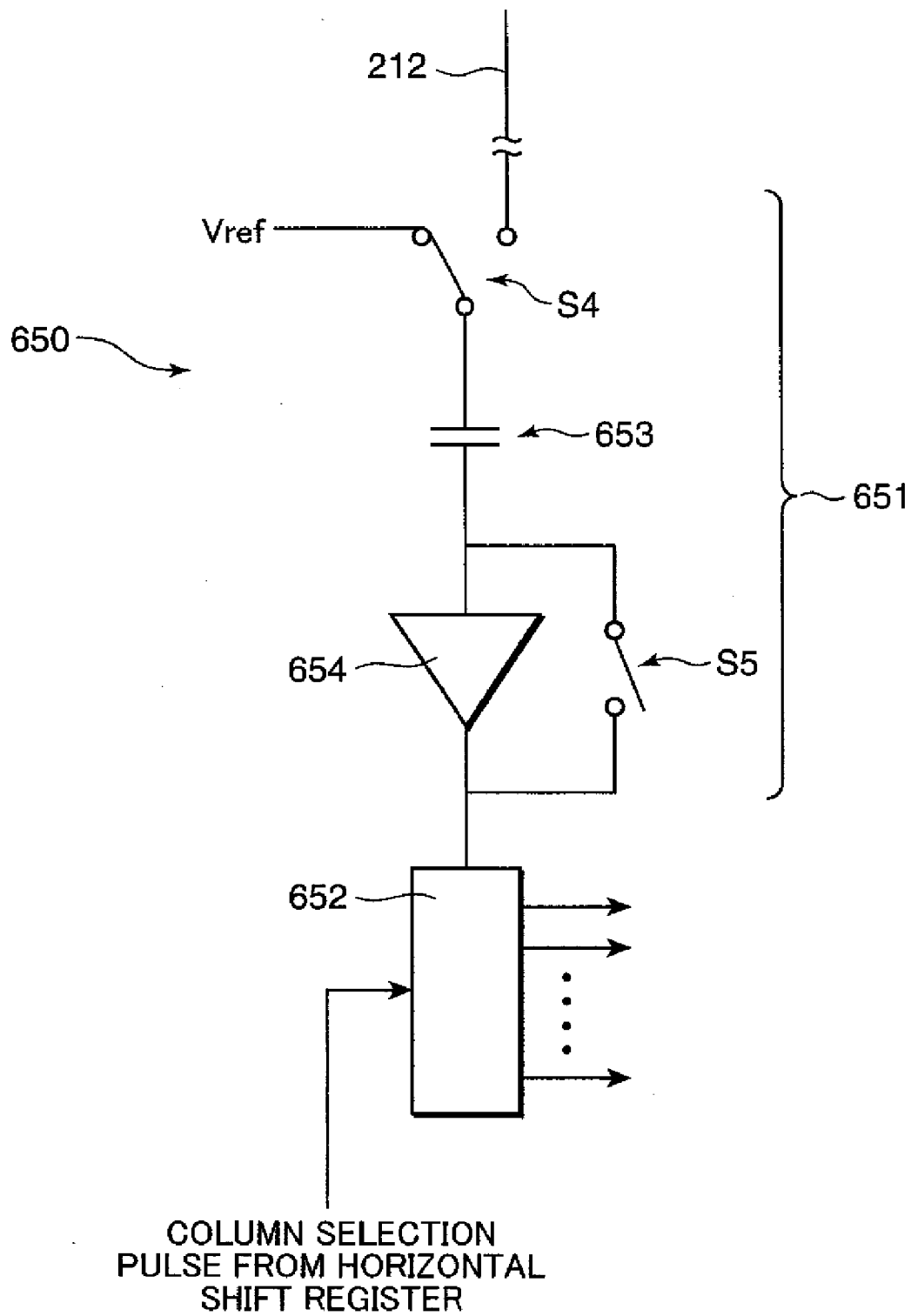
FIG. 12 is a diagram showing an example of an A/D converting circuit.

(C) Each of the vertical output circuits for the characteristics may be internally provided with an A/D converting circuit i.e. an A/D converter. For instance, as shown in FIG. 12, an A/D converting circuit 650 may include a comparator 651 and a latch circuit 652. The comparator 651 has a capacitor 653 connected to the corresponding vertical signal line 212, an inverter amplifier 654, and switches S4 and S5 for switching. In this modification, a difference operation between a noise signal and an image signal, and an A/D converting operation are performed before an output operation of the comparator 651 is performed. The analog amplifying section may be provided anterior or posterior to the A/D converting circuit 650 in the vertical output circuit. Since the vertical output circuit is internally provided with the A/D converting circuit, and the A/D converting circuit has the comparator and a latch portion as the latch circuit, readout operations of the respective characteristic outputs can be performed by the latch portion of the A/D converting circuit, and noise generation at a position posterior to the A/D converting circuit can be prevented.

Figure 13:
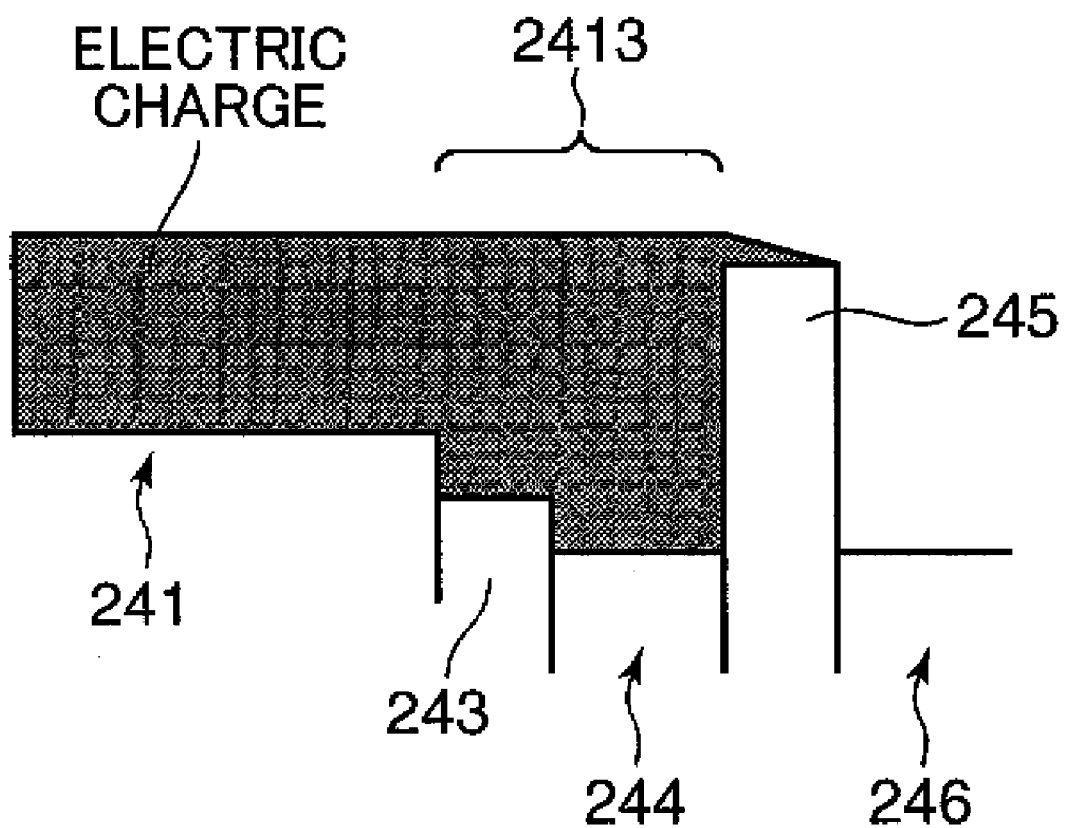
FIG. 13 is a potential chart in the case where a logarithmic characteristic output is obtained by setting the potential of a reset gate to a mid potential.

(D) In the embodiment, as described above referring to FIGS. 6 and 7, the image sensor 1 is configured in such a manner that a logarithmic characteristic output is obtained by setting the potential of the transfer gate during a charge accumulation period to the intermediate potential. Alternatively, as shown in e.g. FIG. 13, a logarithmic characteristic output may be obtained by setting the reset potential of the reset gate 245 during a charge accumulation period to a predetermined intermediate potential. In the modification, the potential of the transfer gate 243 is set to Hi. As compared with the arrangement shown in FIG. 4B, the modification enables to further increase the dynamic range, because the charge accumulation capacitance is increased. Similarly to the timing chart shown in FIG. 7, after the linear characteristic output is sampled i.e. before the logarithmic compression is performed, the potential of the floating node may be temporarily set to a predetermined low level to initialize the floating node, and thereafter, the potential of the floating node may be increased to an intermediate potential defined by the potential of the reset gate 245, and the incident light amount for performing a logarithmic compression output. By performing the above operation, the logarithmic compression can be started in a condition that the floating node 244 is in a low potential condition. Thus, a DC (direct-current) component of the logarithmic characteristic output can be controlled to an intended value by controlling the initialization potential i.e. the potential level of the floating node 244. In the method for setting the potential of the transfer gate 243 to the intermediate potential, although the charge accumulation capacitance is decreased, as compared with the above arrangement, generation of a dark current can be suppressed, because the photoelectric converter 241 is an embedded photodiode, and electric charges are accumulated in the embedded portion, in other words, an upper part of the charge accumulated portion is entirely covered with the P-type region 2411, as shown in FIG. 3.

Figure 14:
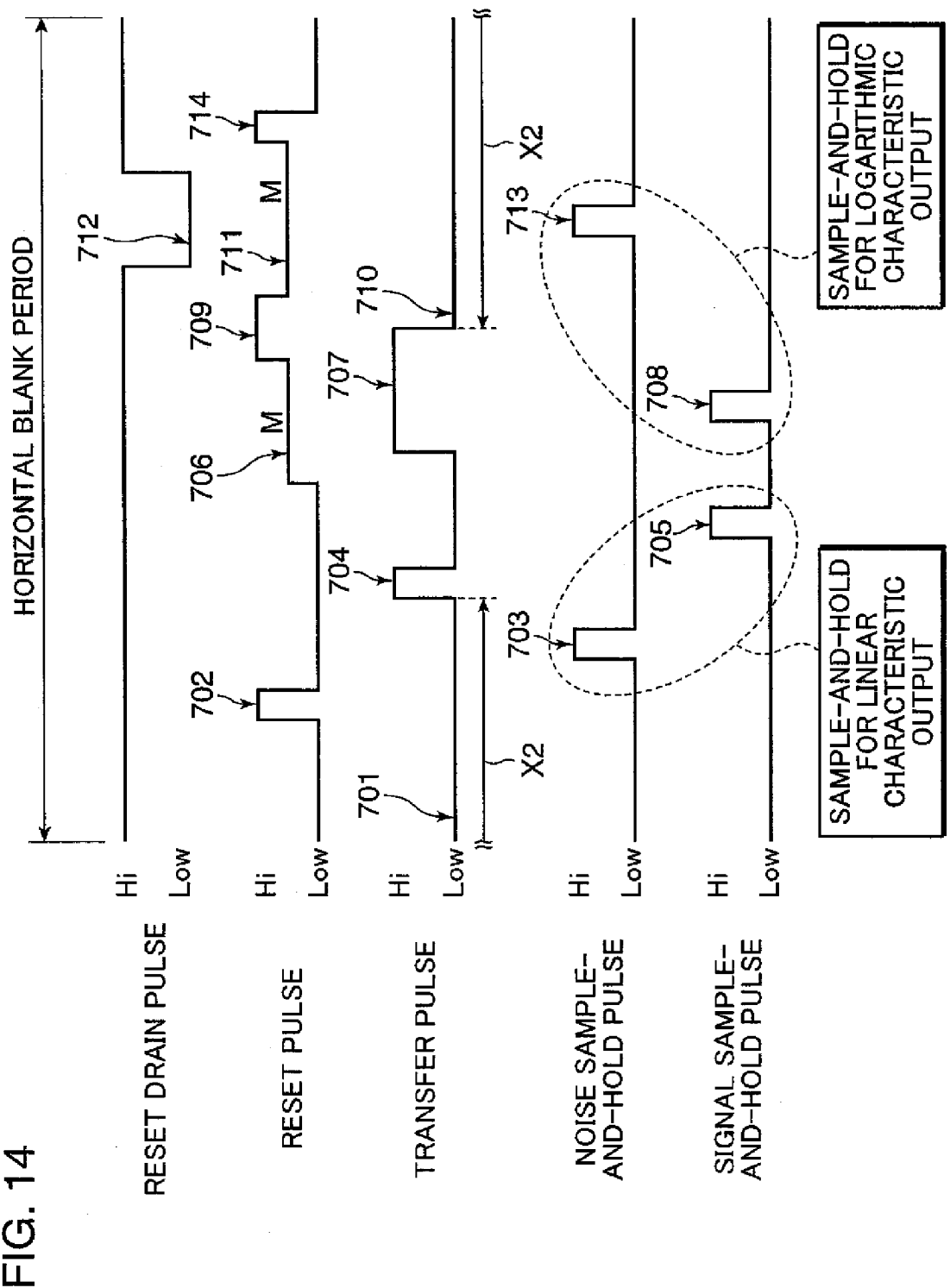
FIG. 14 is a timing chart showing an example on drive pulses in the arrangement shown in FIG. 13.

FIG. 14 is a timing chart, corresponding to the timing charts shown in FIGS. 6 and 7, on drive pulses for sampling a linear characteristic output and a logarithmic characteristic output during one horizontal blank period in the modification (D). First, in the case where the transfer pulse is in an off-state i.e. in a low potential condition at the timing 701, the photoelectric converter 241 is in a charge accumulation period i.e. an exposure period for linear characteristic output. Before the charge accumulation period is ended, at the timing 702, the reset pulse is turned on to set the potential of the floating node 244 to the reset drain potential. Thereafter, at the timing 703, the noise sample-and-hold pulse is turned on to sample-and-hold the reset drain potential as noise. After the sample-and-hold operation of noise is ended, at the timing 704, the transfer pulse is turned on to transfer, to the floating node 244, electric charges accumulated in the photoelectric converter

241 during the charge accumulation period. Thereafter, at the timing 705, the signal sample-and-hold pulse is turned on to sample-and-hold the floating node potential of the floating node 244 as a linear characteristic output. Thus, a sampling operation concerning the linear characteristic output is completed.

Subsequently, at the timing 706, the potential of the reset pulse is set to the mid potential M, and at the timing 707, the transfer pulse is turned on to set the potential of the transfer pulse to Hi. Thereby, the pixel 21 is operative to perform logarithmic compression by the photoelectric converter 241 and the floating node 244. Similarly to the embodiment, in the logarithmic compression to be performed by this arrangement, a logarithmically compressed value with respect to a photocurrent in each of the exposure periods can be converted into a voltage. This enables to eliminate a charge accumulation period i.e. the period X2 or an integration period as required in the linear characteristic output, and enables to secure an output with a short period e.g. the period X1. Then, at the timing 708, the signal sample-and-hold pulse is turned on to sample-and-hold the logarithmic characteristic output. Thereafter, at the timing 709, the reset pulse is turned on to reset the photoelectric converter 241 i.e. the photodiode PD1 and the floating node 244 i.e. the FD. Then, at the timing 710, the transfer pulse is turned off again. A charge accumulation period for linear characteristic output with respect to a succeeding frame image is started from the point of time 710. Thereafter, at the timing 711, the reset pulse is set to the mid potential M again, and at the timing 712, the reset drain pulse is turned off i.e. the reset drain potential is set to Low. Thereafter, by turning the reset drain pulse on i.e. setting the reset drain potential to Hi, an electric charge corresponding to a reference level of logarithmic characteristic flows to the floating node 244, i.e., the potential of the floating node 244 is lowered to a predetermined level. Then, at the timing 713, the noise sample-and-hold pulse is turned on to sample-and-hold the noise signal in the logarithmic characteristic output. Thus, a sampling operation concerning the logarithmic characteristic output is completed. Thereafter, at the timing 714, the reset pulse is turned on again to reset the floating node 244.

Figure 15:
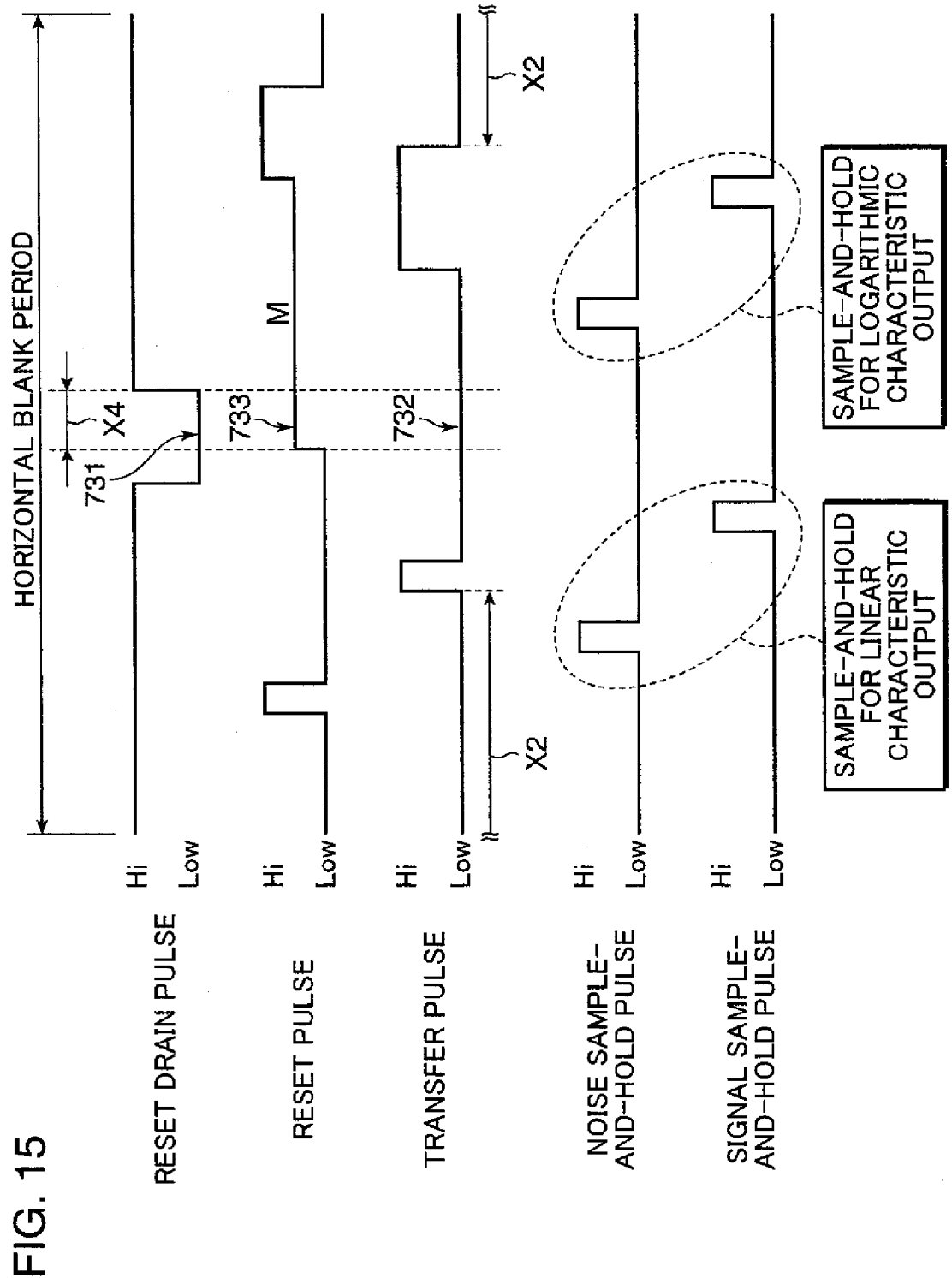
FIG. 15 is a timing chart as a modification of the timing chart shown in FIG. 14.

FIG. 15 shows a modification of the timing chart shown in FIG. 14, and is a timing chart in the case where the photoelectric converter 241 and the floating node 244 are temporarily initialized with a predetermined potential i.e. a low potential before logarithmic compression i.e. logarithmic compression characteristic driving is performed. In the modification, before logarithmic compression is performed, at the timing 731, the reset drain pulse is turned off i.e. the reset drain potential is set to Low, and at the timing 732, the transfer pulse is turned off, and a period X4 when the potential of the reset pulse is kept to the mid potential M is secured by setting the potential of the reset pulse to the mid potential M at the timing 733. Thereby, an electric charge corresponding to the reference level of logarithmic characteristic flows to the photoelectric converter 241 and the floating node 244. In other words, initialization of the photoelectric converter 241 and the floating node 244 is performed by setting the potential of the photoelectric converter 241 and the floating node 244 to the predetermined potential i.e. the low potential.

(E) The image sensor 1 (1*a*) may further include a multiplexer i.e. a serial output circuit for inputting image data outputted from the amplifier 62 i.e. the horizontal signal line 621, and image data outputted from the amplifier 72 i.e. the horizontal signal line 721, wherein the multiplexer serially outputs image data obtained by a linear characteristic output and image data obtained by a logarithmic characteristic output to a processor provided posterior to the multiplexer by switching over between the linear characteristic output and the logarithmic characteristic output. This arrangement enables to integrate the output signal line posterior to the multiplexer into a single signal line, i.e. reduce the number of output signal line, thereby facilitating the wiring. The output circuit includes the serial output circuit for serially outputting the pixel signals having at least two different photoelectric conversion characteristics out of the two or more different photoelectric conversion characteristics, the pixel signals being read out to the vertical output section. This enables to reduce the number of signal line for outputting the characteristics, thereby facilitating the wiring.

(F) In the embodiment, the image sensor 1 (1*a*) having different photoelectric conversion characteristics and capable of performing an image sensing operation with a wide dynamic range is a linear-logarithmic sensor having a photoelectric conversion characteristic comprised of a linear characteristic in a low luminance area where the light amount is small, and a logarithmic characteristic in a high luminance area where the light amount is large. Alternatively, a linear-linear sensor having a photoelectric conversion characteristic comprised of a linear characteristic in both of a low luminance area and a high luminance area e.g. a first linear characteristic 801 and a second linear characteristic 802 whose gradient on a graph is different from each other may be used, as shown in FIG. 16, for instance. Similarly to the embodiment, in the modification, image data is sampled by a sampling circuit i.e. a readout circuit or a vertical output circuit provided with respect to each of the characteristics. Alternatively, a photoelectric conversion characteristic having three or more kinds of characteristics may be used, in place of the photoelectric conversion characteristic having two kinds of characteristics i.e. the linear/logarithmic characteristics, or the first linear characteristic and the second linear characteristic.

The specification discloses the aforementioned technology. The following is a summary of the primary technology on the embodiment and/or modifications.

According to an aspect of the invention, a solid-state image sensing device comprises: a pixel section having two or more different photoelectric conversion characteristics, and adapted to output pixel signals having the photoelectric conversion characteristics individually; an analog amplifying section for amplifying the pixel signals to be outputted from the pixel section in an analog status; and an output circuit for controlling an analog gain with respect to each of the photoelectric conversion characteristics to amplify the pixel signals having the photoelectric conversion characteristics by the analog amplifying section so as to output the amplified pixel signals.

The above arrangement enables to output the characteristics in an identical frame period. Also, even if the gain of either one of the characteristic output images is increased to increase the gradation, for instance, an image sensing operation with a relatively wide dynamic range can be performed, without reducing the dynamic range of an entire image obtained by synthesizing the characteristic output images. Also, as compared with a method for outputting either one of the characteristics in one frame period, use of the method for outputting both of the characteristics in one frame period enables to obtain outputs of both of the characteristics without lowering the frame rate. Thus, the arrangement enables to perform an image sensing operation with a high frame rate, while securing an intended gradation with respect to each of the characteristic regions, and securing a wide dynamic range as a whole.

Preferably, the output circuit may include: a predetermined number of vertical signal lines connected to columns of pixels in the pixel section; a vertical output section connected to the vertical signal lines for reading out the pixel signals from the pixels; and a horizontal shift register for performing a column selecting operation with respect to the vertical output section, wherein the vertical output section is internally provided with a predetermined number of sampling circuits individually provided with respect to the pixel signals having the photoelectric conversion characteristics.

In the above arrangement, the pixel signals having the photoelectric conversion characteristics to be outputted from the pixel section can be individually read out with respect to each of the characteristics. Since the sampling circuits for the photoelectric conversion characteristics are individually provided in the vertical output section, the sampling circuits for the characteristics can be arranged in the vertical output section, without considering the number of vertical output circuits.

Preferably, the output circuit may include: a predetermined number of vertical signal lines connected to columns of pixels in the pixel section; a vertical output section connected to the vertical signal lines for reading out the pixel signals from the pixels; and a horizontal shift register for performing a column selecting operation with respect to the vertical output section, wherein the vertical output section is constituted of a predetermined number of vertical output circuits individually provided with respect to the pixel signals having the photoelectric conversion characteristics, each of the vertical output circuits being internally provided with a sampling circuit.

In the above arrangement, the pixel signals can be sampled by using the individual vertical output circuits with respect to each of the photoelectric conversion characteristics. Also, a paired vertical output circuit is arranged as opposed to each other with respect to the pixel section, for instance. This enables to facilitate layout i.e. designing of the vertical output section.

Preferably, the vertical output section may be internally provided with an A/D converting circuit having a comparator and a latch portion as the sampling circuit.

In the above arrangement, sampling operations of the respective characteristic outputs can be performed by the latch portion of the A/D converting circuit, and noise generation at a position posterior to the A/D converting circuit can be prevented.

Preferably, the sampling circuit may be a sample-and-hold circuit. This arrangement enables to easily realize a circuit for performing a sampling operation by a sample-and-hold circuit.

Preferably, the sampling circuit may be a clamp circuit. This arrangement enables to more easily realize a circuit for performing a sampling operation by a clamp circuit.

Preferably, the output circuit may further include a horizontal signal line connected to the vertical output section, and the analog amplifying section may be provided on the horizontal signal line, or on an extension of the horizontal signal line.

In the above arrangement, a circuit configuration can be simplified without providing an analog amplifying section in the vertical output section.

Preferably, the analog amplifying section may be provided in the vertical output section.

The above arrangement enables to suppress likelihood that noise may be superimposed on a signal line between the vertical output section and the analog amplifying section, in the case where the analog amplifying section is provided e.g. at a position outside the vertical output section.

Preferably, the solid-state image sensing device may further comprise output signal lines for individually outputting the pixel signals read out to the vertical output section with respect to each of the photoelectric conversion characteristics.

The above arrangement enables to eliminates the need of providing an arrangement that data is serially outputted with use of a single output signal line, thereby enabling to output the pixel signals individually with respect to each of the characteristics with a simplified arrangement.

Preferably, the output circuit may further include a serial output circuit for serially outputting the pixel signals having at least two different photoelectric conversion characteristics out of the two or more different photoelectric conversion characteristics, the pixel signals being read out to the vertical output section.

The above arrangement enables to reduce the number of signal line for outputting the pixel signals having the photoelectric conversion characteristics, thereby facilitating the wiring.

Preferably, the solid-state image sensing device may further comprise a gain controlling section for controlling the analog gain of the analog amplifying section.

The above arrangement enables to easily realize an arrangement of controlling the gain of the analog amplifying section with use of the gain controlling section.

Preferably, the output circuit may control the analog gain with respect to the pixel signals having the photoelectric conversion characteristics individually to output the amplified pixel signals in an identical frame period.

The above arrangement enables to output the pixel signals having the photoelectric conversion characteristics without lowering the frame rate.

Preferably, the output circuit may be operative to, in one horizontal blank period, sample the pixel signal having one of the photoelectric conversion characteristics by a sampling circuit upon lapse of an integration period with respect to the one photoelectric conversion characteristic, and sample the pixel signal having the other one of the photoelectric conversion characteristics by the sampling circuit, following the sampling operation, to output the sampled pixel signal having the one photoelectric conversion characteristic and the sampled pixel signal having the other one photoelectric conversion characteristic in accordance with a column selecting operation by a horizontal shift register.

The above arrangement enables to easily realize an arrangement of outputting the pixel signals having the photoelectric conversion characteristics in the identical frame period.

Preferably, the photoelectric conversion characteristics may include a linear characteristic and a logarithmic characteristic.

The above arrangement enables to output the pixel signals having the linear characteristic and the logarithmic characteristic individually from the solid-state image sensing device.

Preferably, each of the pixels may include: a photoelectric converter for generating a photocurrent with respect to incident light to accumulate an electric charge; a floating node for converting the electric charge accumulated in the photoelectric converter into a voltage; an amplifier transistor for amplifying the voltage of the floating node to output the amplified voltage; a transfer gate; and a reset gate, wherein the pixel signal having the logarithmic characteristic is outputted from the amplifier transistor by setting a potential of the transfer gate to an intermediate potential between a high potential and a low potential during an exposure period.

The above arrangement enables to output the pixel signal having the logarithmic characteristic, or the linear characteristic and the linear characteristic from each of the pixels.

Preferably, the each of the pixels may output the pixel signal having the logarithmic characteristic by, after the pixel signal having the linear characteristic is sampled, initializing a potential of the photoelectric converter with a predetermined potential, and increasing the initialized potential of the photoelectric converter to a potential defined by the potential of the transfer gate and an amount of the incident light.

The above arrangement enables to control a DC component of the logarithmic characteristic output to an intended value by controlling the initialization potential i.e. the low potential level of the photoelectric converter.

Preferably, each of the pixels may include: a photoelectric converter for generating a photocurrent with respect to incident light to accumulate an electric charge; a floating node for converting the electric charge accumulated in the photoelectric converter into a voltage; an amplifier transistor for amplifying the voltage of the floating node to output the amplified voltage; a transfer gate; and a reset gate, wherein the pixel signal having the logarithmic characteristic is outputted from the amplifier transistor by setting a potential of the reset gate to an intermediate potential between a high potential and a low potential during an exposure period.

The above arrangement enables to output the pixel signal having the logarithmic characteristic, or the linear characteristic and the linear characteristic from each of the pixels.

Preferably, the each of the pixels may output the pixel signal having the logarithmic characteristic by, after the pixel signal having the linear characteristic is sampled, initializing the potential of the floating node with a predetermined potential, and increasing the initialized potential of the floating node to a potential defined by the potential of the reset gate and an amount of the incident light.

The above arrangement enables to control a DC component of the logarithmic characteristic output to an intended value by controlling the initialization potential i.e. the low potential level of the floating node.

According to another aspect of the invention, a method for driving a solid-state image sensing device provided with a pixel section having two or more different photoelectric conversion characteristics and adapted to output pixel signals having the photoelectric conversion characteristics individually, and an analog amplifying section for amplifying the pixel signals comprises: an output step of controlling an analog gain with respect to each of the photoelectric conversion characteristics to output the pixel signals amplified by the analog amplifying section, wherein the output step is a step of outputting the amplified pixel signals having the photoelectric conversion characteristics in an identical frame period.

In the above arrangement, the pixel signals having the photoelectric conversion characteristics can be outputted without lowering the frame rate.

In the driving method, preferably, the output step may be a step of, in one horizontal blank period, sampling the pixel signal having one of the photoelectric conversion characteristics upon lapse of an integration period with respect to the one photoelectric conversion characteristic, and sampling the pixel signal having the other one of the photoelectric conversion characteristics, following the sampling operation, to output the sampled pixel signal having the one photoelectric conversion characteristic and the sampled pixel signal having the other one photoelectric conversion characteristic in accordance with a column selecting operation by a horizontal shift register.

The above arrangement enables to easily realize a method for driving the pixel signals having the photoelectric conversion characteristics individually in the identical frame period.

According to yet another aspect of the invention, an image sensing system comprises: a solid-state image sensing device configured in such a manner as to output pixel signals having two or more photoelectric conversion characteristics individually; and an image processor for performing an image processing operation individually with respect to the pixel signals having the photoelectric conversion characteristics to be outputted from the solid-state image sensing device, and performing a synthesizing operation with respect to pixel signal data having the photoelectric conversion characteristics after the individual image processing operation.

In the above arrangement, it is easy to perform a predetermined processing operation to the pixel signals to be outputted from the solid-state image sensing device with respect to each of the characteristics e.g. an image processing operation of increasing the gain of a certain characteristic output image, and synthesizing the certain characteristic output image after the gain increase and the other characteristic output image for outputting a synthesized image.

In the image sensing system, preferably, the image processor may include an output processor for performing a predetermined processing operation with respect to outputs having the photoelectric conversion characteristics from the solid-state image sensing device, and information relating to an analog gain with respect to each of the photoelectric conversion characteristics calculated based on the processing operation by the output processor is inputted to the solid-state image sensing device.

The above arrangement enables to calculate the analog gain with respect to each of the characteristics based on the characteristic outputs from the solid-state image sensing device, and amplify the pixel signals in accordance with the calculated analog gain with respect to each of the characteristics by feedback controlling the analog gain information to the solid-state image sensing device for outputting the amplified pixel signals to the output processor. Thus, gain adjustment can be easily performed in such a manner that an intended image is obtained in accordance with an actual exposure operation i.e. an actual image sensing operation by the solid-state image sensing device, or imaging sensitivity control i.e. sensitivity correction can be performed without changing the imaging dynamic range.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A solid-state image sensing device, comprising:
a pixel section including pixels that each have two or more different photoelectric conversion characteristics including a linear characteristic and a logarithmic characteristic, the pixel section adapted to output plural pixel signals for each of the pixels within a single frame period, each of the plural pixel signals for an individual pixel reflect a different photoelectric conversion characteristic of the individual pixel;
an analog amplifying section for amplifying the pixel signals to be outputted from the pixel section in an analog status; and
an output circuit for controlling an analog gain with respect to each of the photoelectric conversion characteristics to amplify the pixel signals having the photoelectric conversion characteristics by the analog amplifying section so as to output the amplified pixel signals.

2. The solid-state image sensing device according to claim 1, wherein
the output circuit includes:
a predetermined number of vertical signal lines connected to columns of pixels in the pixel section;
a vertical output section connected to the vertical signal lines for reading out the pixel signals from the pixels; and
a horizontal shift register for performing a column selecting operation with respect to the vertical output section, wherein
the vertical output section is internally provided with a predetermined number of sampling circuits individually provided with respect to the pixel signals having the photoelectric conversion characteristics.

3. The solid-state image sensing device according to claim 2, wherein
the vertical output section is internally provided with an A/D converting circuit having a comparator and a latch portion as the sampling circuit.

4. The solid-state image sensing device according to claim 2, wherein
the sampling circuit is a sample-and-hold circuit.

5. The solid-state image sensing device according to claim 4, wherein
the output circuit further includes a horizontal signal line connected to the vertical output section, and
the analog amplifying section is provided on the horizontal signal line, or on an extension of the horizontal signal line.

6. The solid-state image sensing device according to claim 2, wherein
the sampling circuit is a clamp circuit.

7. The solid-state image sensing device according to claim 2, wherein
the analog amplifying section is provided in the vertical output section.

8. The solid-state image sensing device according to claim 2, further comprising
output signal lines for individually outputting the pixel signals read out to the vertical output section with respect to each of the photoelectric conversion characteristics.

9. The solid-state image sensing device according to claim 2, wherein
the output circuit further includes a serial output circuit for serially outputting the pixel signals having at least two different photoelectric conversion characteristics out of the two or more different photoelectric conversion characteristics, the pixel signals being read out to the vertical output section.

10. The solid-state image sensing device according to claim 1, wherein
the output circuit includes:
a predetermined number of vertical signal lines connected to columns of pixels in the pixel section;
a vertical output section connected to the vertical signal lines for reading out the pixel signals from the pixels; and
a horizontal shift register for performing a column selecting operation with respect to the vertical output section, wherein
the vertical output section is constituted of a predetermined number of vertical output circuits individually provided with respect to the pixel signals having the photoelectric conversion characteristics, each of the vertical output circuits being internally provided with a sampling circuit.

11. The solid-state image sensing device according to claim 1, further comprising
a gain controlling section for controlling the analog gain of the analog amplifying section.

12. The solid-state image sensing device according to claim 1, wherein
the output circuit controls the analog gain with respect to the pixel signals having the photoelectric conversion characteristics individually to output the amplified pixel signals in an identical frame period.

13. The solid-state image sensing device according to claim 12, wherein
the output circuit is operative to, in one horizontal blank period, sample the pixel signal having one of the photoelectric conversion characteristics by a sampling circuit upon lapse of an integration period with respect to the one photoelectric conversion characteristic, and sample the pixel signal having the other one of the photoelectric conversion characteristics by the sampling circuit, following the sampling operation, to output the sampled pixel signal having the one photoelectric conversion characteristic and the sampled pixel signal having the other one photoelectric conversion characteristic in accordance with a column selecting operation by a horizontal shift register.

14. The solid-state image sensing device according to claim 1, wherein
each of the pixels includes:
a photoelectric converter for generating a photocurrent with respect to incident light to accumulate an electric charge;
a floating node for converting the electric charge accumulated in the photoelectric converter into a voltage;
an amplifier transistor for amplifying the voltage of the floating node to output the amplified voltage;
a transfer gate; and
a reset gate, wherein
the pixel signal having the logarithmic characteristic is outputted from the amplifier transistor by setting a potential of the transfer gate to an intermediate potential between a high potential and a low potential during an exposure period.

15. The solid-state image sensing device according to claim 14, wherein
the each of the pixels outputs the pixel signal having the logarithmic characteristic by, after the pixel signal having the linear characteristic is sampled, initializing a potential of the photoelectric converter with a predetermined potential, and increasing the initialized potential of the photoelectric converter to a potential defined by the potential of the transfer gate and an amount of the incident light.

16. The solid-state image sensing device according to claim 1, wherein each of the pixels includes: a photoelectric converter for generating a photocurrent with respect to incident light to accumulate an electric charge; a floating node for converting the electric charge accumulated in the photoelectric converter into a voltage; an amplifier transistor for amplifying the voltage of the floating node to output the amplified voltage; a transfer gate; and a reset gate, wherein the pixel signal having the logarithmic characteristic is outputted from the amplifier transistor by setting a potential of the reset gate to an intermediate potential between a high potential and a low potential during an exposure period.

17. The solid-state image sensing device according to claim 16, wherein
the each of the pixels outputs the pixel signal having the logarithmic characteristic by, after the pixel signal having the linear characteristic is sampled, initializing the potential of the floating node with a predetermined potential, and increasing the initialized potential of the floating node to a potential defined by the potential of the reset gate and an amount of the incident light.

18. A method for driving a solid-state image sensing device provided with a pixel section including pixels that each have two or more different photoelectric conversion characteristics including a linear characteristic and a logarithmic characteristic, the pixel section adapted to output plural pixel signals for each of the pixels within a single frame period, each of the plural pixel signals for an individual pixel reflect a different photoelectric conversion characteristic of the individual pixel, and an analog amplifying section for amplifying the pixel signals, the driving method comprising:
an output step of controlling an analog gain with respect to each of the photoelectric conversion characteristics to output the plural pixel signals for each of the pixels amplified by the analog amplifying section, wherein
the output step is a step of outputting each of the plural amplified pixel signals for an individual pixel reflecting the different photoelectric conversion characteristics of that individual pixel in an identical frame period.

19. The driving method according to claim 18, wherein
the output step is a step of, in one horizontal blank period, sampling the pixel signal having one of the photoelectric conversion characteristics upon lapse of an integration period with respect to the one photoelectric conversion characteristic, and sampling the pixel signal having the other one of the photoelectric conversion characteristics, following the sampling operation, to output the sampled pixel signal having the one photoelectric conversion characteristic and the sampled pixel signal having the other one photoelectric conversion characteristic in accordance with a column selecting operation by a horizontal shift register.

20. An image sensing system, comprising:
a solid-state image sensing device configured in such a manner as to output plural pixel signals for each pixel within a single frame period, each pixel having two or more photoelectric conversion characteristics including a linear characteristic and a logarithmic characteristic, each of the plural pixel signals for an individual pixel reflecting a different photoelectric conversion characteristic of the individual pixel; and
an image processor for performing an image processing operation individually with respect to the pixel signals having the photoelectric conversion characteristics to be outputted from the solid-state image sensing device, and performing a synthesizing operation with respect to pixel signal data having the photoelectric conversion characteristics after the individual image processing operation.

21. The image sensing system according to claim 20, wherein
the image processor includes an output processor for performing a predetermined processing operation with respect to outputs having the photoelectric conversion characteristics from the solid-state image sensing device, and
information relating to an analog gain with respect to each of the photoelectric conversion characteristics calculated based on the processing operation by the output processor is inputted to the solid-state image sensing device.

* * * * *